US007742637B2

(12) United States Patent
Xiao et al.

(10) Patent No.: US 7,742,637 B2
(45) Date of Patent: Jun. 22, 2010

(54) APPARATUS, METHOD, AND PROGRAM FOR TAKING AN IMAGE, AND APPARATUS, METHOD, AND PROGRAM FOR PROCESSING AN IMAGE

(75) Inventors: Ruihua Xiao, Tokyo (JP); Akira Shiga, Tokyo (JP); Hun Koo Park, Kanagawa (JP); Tatsuya Deguchi, Kanagawa (JP)

(73) Assignee: Sony Corporation (JP)

( * ) Notice: Subject to any disclaimer, the term of this patent is extended or adjusted under 35 U.S.C. 154(b) by 960 days.

(21) Appl. No.: 11/512,614

(22) Filed: Aug. 30, 2006

(65) Prior Publication Data

US 2007/0081721 A1    Apr. 12, 2007

(30) Foreign Application Priority Data

Aug. 31, 2005    (JP) .................... P2005-252250

(51) Int. Cl.
*G06K 9/00* (2006.01)
*H04N 5/228* (2006.01)

(52) U.S. Cl. .................... 382/167; 382/168; 348/222.1
(58) Field of Classification Search .................. 382/167, 382/168; 348/362, 222.1
See application file for complete search history.

(56) References Cited

U.S. PATENT DOCUMENTS

| 5,194,960 | A  | * | 3/1993  | Ota ............................. 348/362 |
| 5,224,177 | A  | * | 6/1993  | Doi et al. ..................... 382/168 |
| 5,874,988 | A  | * | 2/1999  | Gu ............................... 348/97 |
| 6,462,835 | B1 | * | 10/2002 | Loushin et al. ............... 358/1.9 |
| 6,694,051 | B1 | * | 2/2004  | Yamazoe et al. ............. 382/167 |
| 6,885,405 | B1 | * | 4/2005  | Steinberg et al. ............ 348/371 |
| 7,010,160 | B1 | * | 3/2006  | Yoshida ....................... 382/162 |
| 7,200,265 | B2 | * | 4/2007  | Imai ............................. 382/168 |
| 7,436,995 | B2 | * | 10/2008 | Ito et al. ...................... 382/162 |
| 2001/0007599 | A1 |   | 7/2001  | Iguchi et al. |
| 2002/0024609 | A1 | * | 2/2002  | Matsushima ................. 348/362 |
| 2002/0118889 | A1 | * | 8/2002  | Shimizu ....................... 382/274 |
| 2004/0184673 | A1 | * | 9/2004  | Watanabe .................... 382/274 |

(Continued)

FOREIGN PATENT DOCUMENTS

EP    1085494    3/2001

(Continued)

*Primary Examiner*—Samir A Ahmed
*Assistant Examiner*—Li Liu
(74) *Attorney, Agent, or Firm*—Lerner, David, Littenberg, Krumholz & Mentlik, LLP

(57) ABSTRACT

An imaging apparatus includes an imaging unit configured to take an image of a subject; a histogram producing unit configured to produce a histogram of image data of the image; a tone correction unit configured to make a tone correction on the image data; a feature histogram table including a plurality of feature histograms respectively corresponding to a plurality of reference image patterns; an input-output characteristic table including a plurality of input-output characteristics respectively corresponding to the plurality of feature histograms; an input-output characteristic adjustment unit configured to calculate the similarity of the histogram produced by the histogram producing unit with respect to each feature histogram, to select an input-output characteristic according to the calculated similarity, and to adjust the selected input-output characteristic in accordance with the similarity, wherein the tone correction unit is configured to make the tone correction based on the input-output characteristic adjusted by the input-output characteristic adjustment unit.

21 Claims, 18 Drawing Sheets

U.S. PATENT DOCUMENTS

| | | | |
|---|---|---|---|
| 2004/0190789 A1* | 9/2004 | Liu et al. | 382/274 |
| 2004/0239796 A1* | 12/2004 | Imai | 348/362 |
| 2005/0074232 A1* | 4/2005 | Nakata et al. | 396/111 |
| 2005/0123211 A1* | 6/2005 | Wong et al. | 382/254 |
| 2005/0141777 A1 | 6/2005 | Kuwata | |
| 2006/0119713 A1* | 6/2006 | Deguchi et al. | 348/231.7 |
| 2007/0229863 A1* | 10/2007 | Ono et al. | 358/1.9 |
| 2008/0002216 A1* | 1/2008 | Matsushima | 358/1.9 |

FOREIGN PATENT DOCUMENTS

| | | |
|---|---|---|
| JP | 2874192 B2 | 1/1991 |
| JP | 2002-077616 A | 3/2002 |

* cited by examiner

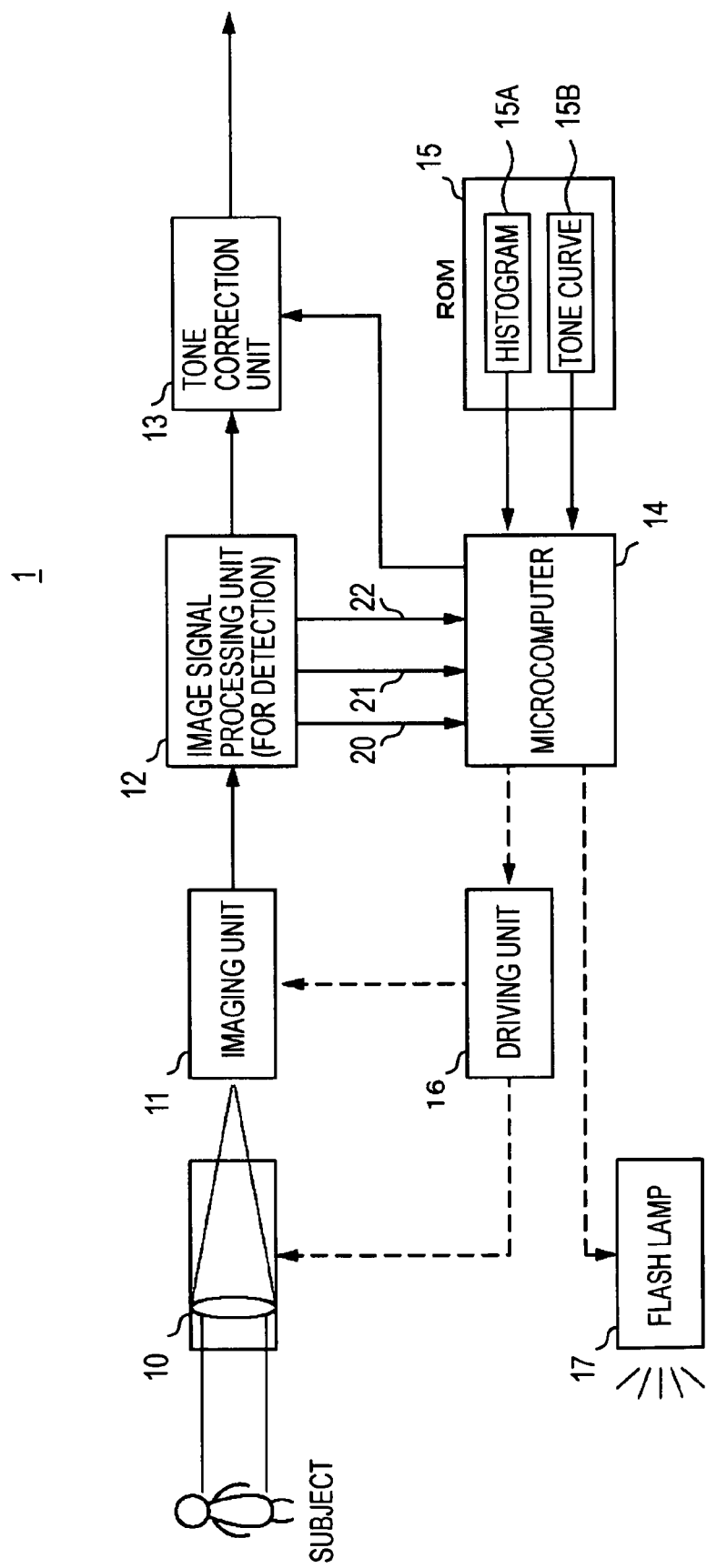

| T(m) | Ptn_Num | G(m) |
|---|---|---|
| T(1) | 1 | G(1) |
| T(2) | 2 | G(2) |
| T(3) | 3 | G(3) |
| ⋮ | ⋮ | ⋮ |

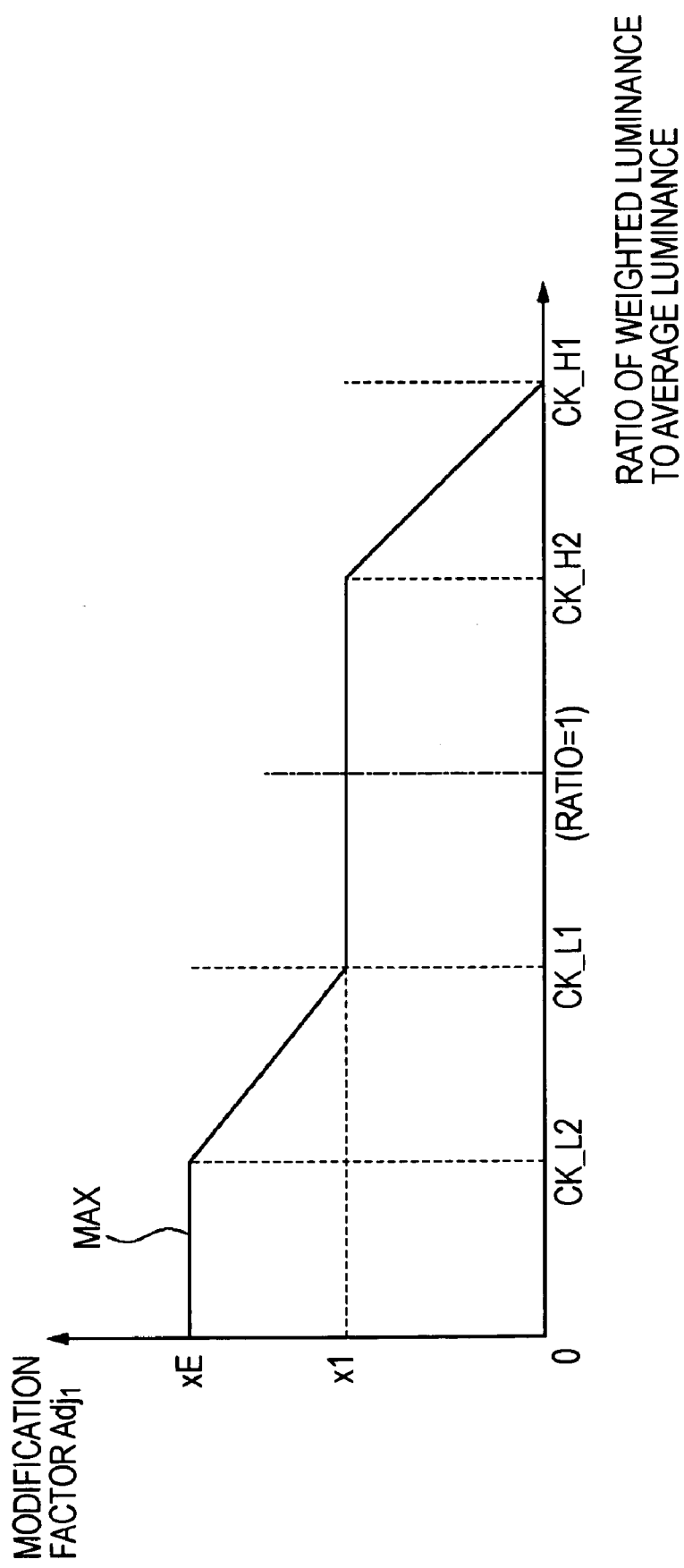

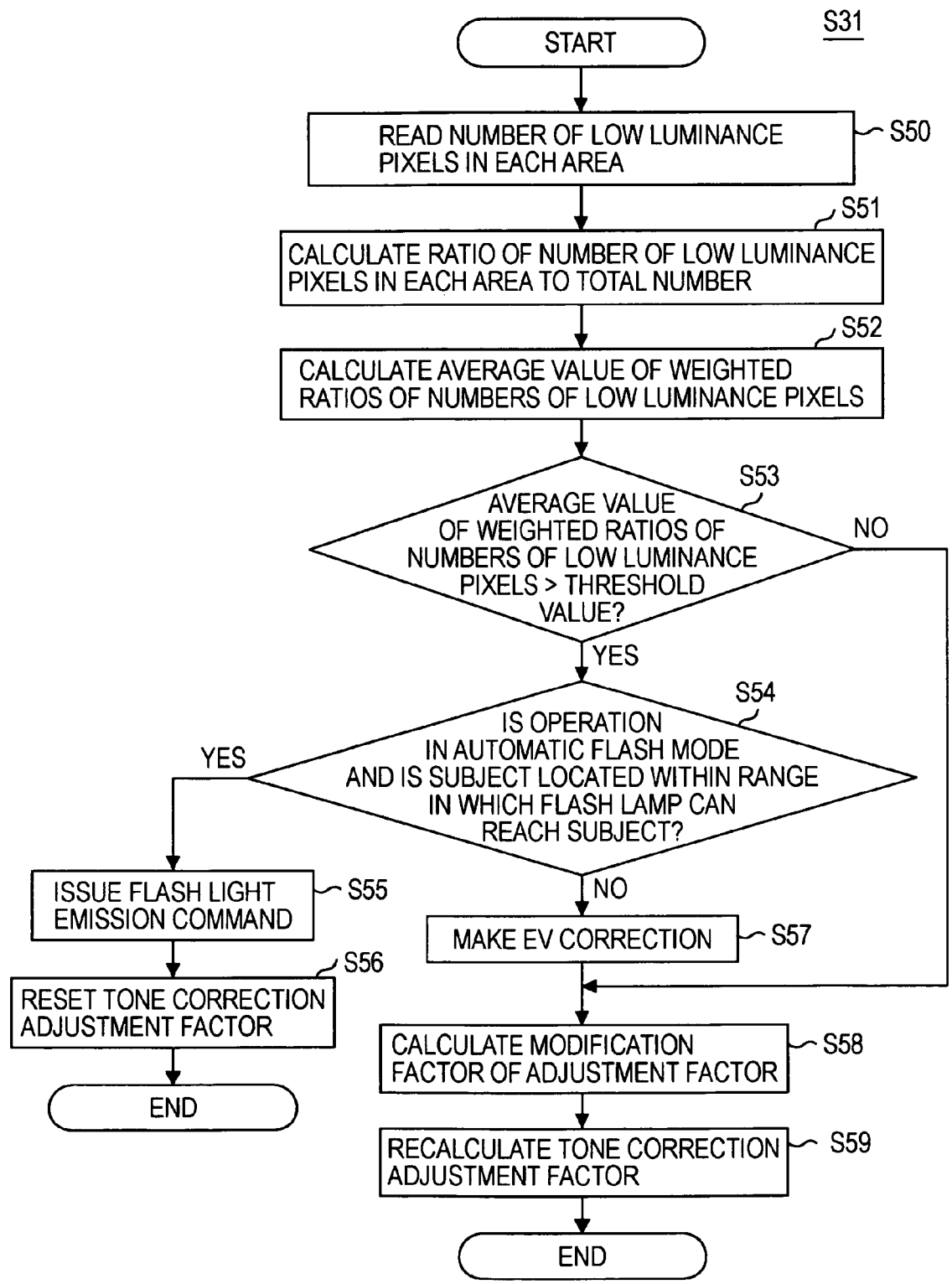

APPARATUS, METHOD, AND PROGRAM FOR TAKING AN IMAGE, AND APPARATUS, METHOD, AND PROGRAM FOR PROCESSING AN IMAGE

CROSS-REFERENCE TO RELATED APPLICATIONS

The present application claims priority from Japanese Patent Application No. JP 2005-252250 filed on Aug. 31, 2005, the disclosure of which is hereby incorporated by reference herein.

BACKGROUND OF THE INVENTION

1. Field of the Invention

The present invention relates to an imaging apparatus, an imaging method, and an imaging program capable of adaptively correcting image data and also to an image processing apparatus, an image processing method, and an image processing program capable of adaptively correction image data.

2. Description of the Related Art

A digital camera is widely used which allows it to take an image by sensing light from a subject using an image sensor such as a CCD (Charge Coupled Device), processing an image signal output from the image sensor, and storing digital image data obtained as a result of the signal processing into a storage medium such as a semiconductor memory. Many digital cameras have a capability that allows a user to perform various kinds of image processing such as edge enhancement, contrast correction, color correction, etc. on image data taken using the digital camera.

The digital camera also has a capability, as one of various kinds of image processing, of correcting the relative relationship between an input signal and an output signal (hereinafter, the correction will be referred to as the input-output characteristic correction). The input-output characteristic correction allows it to improve image quality of an image taken by the digital camera. For example, an image whose luminance distribution is concentrated about a particular luminance level over the entire area of the image and thus whose contrast is low can be corrected so as to have high contrast. When an image is taken against light, the resultant image is generally dark in an area of a main subject and light in a peripheral area. The input-output characteristic correction allows such an image to be corrected so as to increase the brightness of the main subject area and decrease the brightness of the peripheral area.

With reference to FIGS. 19 and 20, the input-output characteristic correction is further described. FIGS. 19A and 19B show an example of a tone correction (by an input-output characteristic correction) applied to an image whose luminance distribution is concentrated about a particular luminance level over the entire area of the image and thus whose contrast is low. FIG. 19A shows an example of a histogram of luminance of such a type of image. In FIG. 19A, a horizontal axis represents luminance and a vertical axis represents the frequency of luminance of pixels over the entire area of the image. The luminance histogram of the original uncorrected image is represented by a solid line x. In this example, the original image has a luminance distribution concentrated about a particular level in a middle range and thus has low contrast.

FIG. 19B shows an example of a luminance input-output characteristic curve (also referred to as a tone curve) used to correct the image data having the luminance distribution represented by the solid line x in FIG. 19A. As shown in FIG. 19B, the tone curve G used for the present purpose is concave in a low luminance range of the input signal and is convex in a high luminance range, that is, the tone curve G has an S-like shape. The application of this tone curve G causes the luminance in the low range to become lower and the luminance in the high range to become higher as represented by a broken line y in FIG. 19A, and thus the contrast of the image is improved.

FIGS. 20A and 20B show an example of an input-output characteristic correction for an image taken against light. FIG. 20A shows an example of a histogram of luminance of such a type of image. As represented by a solid line x in FIG. 20A, the original uncorrected image has a luminance distribution concentrated in two ranges: a very high luminance range corresponding to an area against light; and a very low luminance range corresponding to a subject illuminated from behind. An image of a subject with such a luminance distribution concentrated in two ranges generally has a dark tone over the entire area of the image, and it is difficult to perceive details of the subject.

FIG. 20B shows an example of a tone curve G usable to make an input-output character correction on image data with a luminance distribution represented by a solid line x in FIG. 20A. As shown in FIG. 20B, the tone curve G used for the present purpose is convex in a low luminance range of the input signal and is concave in a high luminance range, that is, the tone curve G has an S-like shape. In FIG. 20A, a broken line y represents a luminance distribution obtained as a result of the input-output characteristic correction using the tone curve G shown in FIG. 20B. As can be seen, the number of pixels in the low luminance range close to the luminance level of 0 and the number of pixels in the high luminance range close to the luminance level of 255 are decreased, and the number of pixels in the middle luminance range is increased. As a result, the backlight effects are suppressed, and it becomes possible to perceive details of the image.

To properly determine a tone curve, expert knowledge on image data is necessary, and thus it is difficult for general users having no expert knowledge to properly make an input-output characteristic correction. To solve the above problem, some techniques have been proposed which allow it to automatically correct luminance of image data.

For example, in a technique disclosed in Japanese Patent Laid-Open No. 2002-77616, a tone curve used in the input-output characteristic correction is selected according to a feature of luminance histogram of a given image, and the input-output characteristic correction is automatically made according to the selected tone curve. More specifically, in this technique disclosed in Japanese Patent Laid-Open No. 2002-77616, a highlight point, a shadow point, and the degree of balance of a histogram are determined from a histogram of a given image, and a tone curve is selected according to these parameters.

Japanese Patent No. 2874192 discloses a technique to automatically correct exposure for an image including a solid black area due to illumination from behind. More specifically, in this technique, a relatively bright area is detected from a given image based on a signal output from an AGC (Automatic Gain Control) amplifier, the ratio of the bright area to the total area of each block of a camera screen is determined, a determination as to whether a subject is illuminated from front or from behind is made based on the determination result as to the ratio of the bright area, and the AGC and the aperture are controlled by generating a reference signal according to the determination result as to the illumination.

In the above-described technique disclosed in Japanese Patent Laid-Open No. 2002-77616, the tone curve used in the tone correction is switched discontinuously at threshold values of parameters. A sudden change in the tone curve at a threshold value results in a difficulty in precisely controlling the tone correction.

On the other hand, in the technique disclosed in Japanese Patent No. 2874192, when a background area has high luminance, details of the background image are often lost. That is, in the background area, pixel values higher than 100% level in white are forced to be clipped to the 100% level.

Accordingly, it is desirable to provide an imaging apparatus, an imaging method, and an imaging program capable of adaptively correcting image data so as to obtain an image with a natural tone. It is also desirable to provide an image processing apparatus, an image processing method, and an image processing program capable of adaptively correcting image data so as to obtain an image with a natural tone.

SUMMARY OF THE INVENTION

In view of the above, according to an embodiment of the present invention, there is provided an imaging apparatus including an imaging unit configured to take an image of a subject and output image data of the image of the subject; a histogram producing unit configured to produce a histogram of the image data output from the imaging unit; a tone correction unit configured to make a tone correction on the image data output from the imaging unit; a feature histogram table in which a plurality of feature histograms respectively corresponding to a plurality of reference image patterns are stored; an input-output characteristic table in which a plurality of input-output characteristics respectively corresponding to the plurality of feature histograms are stored; and an input-output characteristic adjustment unit configured to calculate a degree of approximation of the histogram produced by the histogram producing unit with respect to each of the plurality of feature histograms stored in the feature histogram table, to select an input-output characteristic from the input-output characteristic table in accordance with the calculated degree of approximation, and to adjust the selected input-output characteristic in accordance with the degree of approximation, the tone correction unit being configured to make the tone correction using the input-output characteristic adjusted by the input-output characteristic adjustment unit.

According an embodiment of the present invention, there is provided an imaging method including taking an image of a subject and outputting image data of the image of the subject; producing a histogram of the output image data; making a tone correction on the output image data; adjusting an input-output characteristic by calculating a degree of approximation of the produced histogram with respect to each of a plurality of feature histograms stored in a feature histogram table and respectively corresponding to a plurality of reference image patterns; selecting, in accordance with the calculated degree of approximation, one of input-output characteristics stored in an input-output characteristic table and respectively corresponding to the plurality of feature histograms; and adjusting the selected input-output characteristic in accordance with the degree of approximation, the tone correction step including making the tone correction using the adjusted input-output characteristic.

According to an embodiment of the present invention, there is provided an imaging program configured to be executed by a computer to implement an imaging method, the method including taking an image of a subject and outputting image data of the image of the subject; producing a histogram of the output image data; making a tone correction on the output image data; adjusting an input-output characteristic by calculating a degree of approximation of the produced histogram with respect to each of a plurality of feature histograms stored in a feature histogram table and respectively corresponding to a plurality of reference image patterns; selecting, in accordance with the calculated degree of approximation, one of input-output characteristics stored in an input-output characteristic table and respectively corresponding to the plurality of feature histograms; and adjusting the selected input-output characteristic in accordance with the degree of approximation, the tone correction step including making the tone correction using the adjusted input-output characteristic.

According to an embodiment of the present invention, there is provided an image processing apparatus including a histogram producing unit configured to produce a histogram of image data; a tone correction unit configured to make a tone correction on the image data; a feature histogram table in which a plurality of feature histograms respectively corresponding to a plurality of reference image patterns are stored; an input-output characteristic table in which a plurality of input-output characteristics respectively corresponding to the plurality of feature histograms are stored; and an input-output characteristic adjustment unit configured to calculate a degree of approximation of the histogram produced by the histogram producing unit with respect to each of the plurality of feature histograms stored in the feature histogram table, to select an input-output characteristic from the input-output characteristic table in accordance with the calculated degree of approximation, and to adjust the selected input-output characteristic in accordance with the degree of approximation, the tone correction unit being configured to make the tone correction using the input-output characteristic adjusted by the input-output characteristic adjustment unit.

According to an embodiment of the present invention, there is provided an image processing method including producing a histogram of image data; making a tone correction on the image data; adjusting an input-output characteristic by calculating a degree of approximation of the produced histogram with respect to each of a plurality of feature histograms stored in a feature histogram table and respectively corresponding to a plurality of reference image patterns; selecting, in accordance with the calculated degree of approximation, one of input-output characteristics stored in an input-output characteristic table and respectively corresponding to the plurality of feature histograms; and adjusting the selected input-output characteristic in accordance with the degree of approximation, the tone correction step including making the tone correction using the adjusted input-output characteristic.

According to an embodiment of the present invention, there is provided an image processing program configured to be executed by a computer to implement an image processing method, the method including producing a histogram of image data; making a tone correction on the image data; adjusting an input-output characteristic by calculating a degree of approximation of the produced histogram with respect to each of a plurality of feature histograms stored in a feature histogram table and respectively corresponding to a plurality of reference image patterns; selecting, in accordance with the calculated degree of approximation, one of input-output characteristics stored in an input-output characteristic table and respectively corresponding to the plurality of feature histograms; and adjusting the selected input-output characteristic in accordance with the degree of approximation, the tone correction step including making the tone correction using the adjusted input-output characteristic.

In an embodiment of the present invention, as described above, the degree of approximation of the histogram of image data of an image of a subject is calculated with respect to each of a plurality of feature histograms stored in a feature histogram table and respectively corresponding to a plurality of reference image patterns. In accordance with the calculated degree of approximation, an input-output characteristic is selected from input-output characteristics stored in an input-output characteristic table and respectively corresponding to the plurality of feature histograms. The selected input-output characteristic is adjusted in accordance with the degree of approximation, and the tone correction of the image data of the image is made using the adjusted input-output characteristic. Thus, it is possible to make the tone correction according to an input-output characteristic well adjusted depending on given image data, and thus it is possible to easily obtain an image with a very natural tone.

In another embodiment of the present invention, the degree of approximation of the histogram of image data is calculated with respect to each of a plurality of feature histograms stored in a feature histogram table and respectively corresponding to a plurality of reference image patterns. In accordance with the calculated degree of approximation, an input-output characteristic is selected from input-output characteristics stored in an input-output characteristic table and respectively corresponding to the plurality of feature histograms. The selected input-output characteristic is adjusted in accordance with the degree of approximation, and the tone correction of the image data is made using the adjusted input-output characteristic. Thus, it is possible to make the tone correction according to an input-output characteristic well adjusted depending on given image data, and thus it is possible to obtain an image with a very natural tone.

BRIEF DESCRIPTION OF THE DRAWINGS

FIG. 1 is a block diagram showing an example of a configuration of an imaging apparatus according to an embodiment of the present invention;

FIG. 13 is a graph showing an example of the relationship between a luminance ratio and a modification factor Adj1 of a tone correction adjustment factor;

FIG. 14 is a flow chart showing an example of a process of correcting a solid black area;

DETAILED DESCRIPTION

Figure 2A:
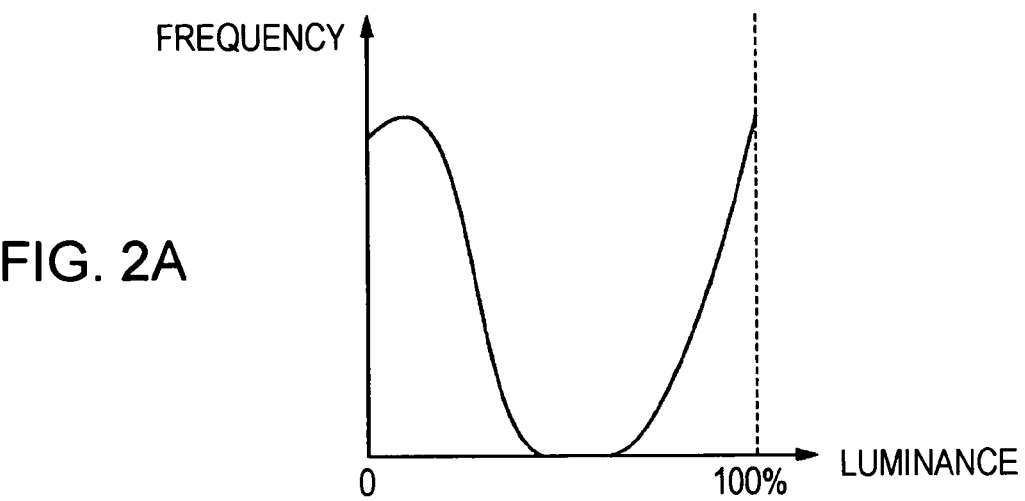
FIGS. 2A to 2C are graphs showing examples of feature histograms stored in a feature histogram table.

The present invention is described below with reference to an embodiment. In this embodiment, a histogram in terms of the luminance of image data is prepared as a feature histogram for each of a plurality of typical image patterns, such as an image taken against light, a low-contrast image with a luminance distribution concentrated in a middle luminance range, and an image with low luminance over the entire image area. An input-output characteristic, according to which to adjust the relative relationship between an input and an actual output, is defined in advance for each feature histogram. When image data is given, a feature histogram having highest similarity to the luminance histogram of the given image data is retrieved from the plurality of feature histograms, and an input-output characteristic corresponding to the retrieved feature histogram is adjusted according to the similarity. Using this adjusted input-output characteristic, the image data is corrected. As required, a fine adjustment of the input-output characteristic is made adaptively according to information associated with the image data or information indicating conditions under which the image data was taken. This makes it possible to properly correct image data such as image data taken against light or image data with low contrast without having to perform a complicated operation.

The input-output characteristic defining the relative relationship between the input of image data and the actual output is expressed by a curve or a line which maps the luminance of the input image data onto output luminance. Hereinafter, the curve or the line representing the input-output characteristic will be referred to as a tone curve, and the correction of image data using the tone curve will be referred to as the tone correction. When a tone curve is convex with respect to a line that maps the input onto the output at a ratio of 1:1, application of this tone curve results in expansion of the tone of the input image data. On the other hand, application of a tone curve which is concave with respect to this line results in compression of the tone of the input image data.

FIG. 1 shows an example of a configuration of an imaging apparatus 1 according to an embodiment of the present invention. The optical system 10 includes at least a lens, an aperture mechanism, and a focusing mechanism. The aperture mechanism and the focusing mechanism are driven in accordance with a control signal output from a driving unit 16 that will be described later. The optical system 10 may have a zooming capability.

An imaging unit 11 includes an image sensor such as a CCD (Charge Coupled Device) adapted to convert light into an electrical signal by photoelectric conversion and a shutter that controls a photoelectric conversion time of the image sensor when an image is taken. The shutter operates in accordance with a control signal that is supplied from the driving unit 16 (described later) in response to an operation on a shutter button (not shown). In the imaging unit 11, the electrical signal obtained as a result of the photoelectric conversion made on the light incident on the image sensor is subjected to particular signal processing to convert the electric signal into an image signal including a R (red) signal component, a G (green) signal component, and a B (blue) signal component. More specifically, the electrical signal output from the image sensor is input to a CDS (Correlated Double Sampling) circuit in which only a signal having image information is sampled and noise is removed. Thereafter, the signal is input to an AGC (Auto Gain Control) circuit to adjust the gain thereof. The signal is then converted into image data by an analog-to-digital converter and the resultant image data is output.

An image signal processing unit 12 performs detection-based signal processing on the input image data. More specifically, the image signal processing unit 12 produces a luminance histogram based on the luminance information of the input image data. For example, the luminance range from the lowest value to the highest value is divided into a predetermined number of intervals, and the number of occurrences of luminance values is determined for each interval over the entire area of or for a particular part (block) of one frame of the input image data, thereby producing the luminance histogram. The resultant histogram data 20 is supplied to a microcomputer 14 (described later).

Based on the input image data, the image signal processing unit 12 determines the average luminance Y[i] [j] for each of blocks into which one frame is divided (hereinafter, such blocks will be referred to simply as blocks), and also determines the average luminance Yave over the one frame. Furthermore, based on the luminance information of the input image data, the image signal processing unit 12 counts the number of pixels, CYL[i] [j], having a luminance value equal to or lower than a threshold value for each block of one frame. Information 21 indicating the average luminance Y[i] [j] of each block and the average luminance Yave over the entire area of one frame (hereinafter, the information 21 will be referred to as the average luminance information 21) and information 22 indicating the number of pixels, CYL[i] [j], having luminance equal to or lower than the threshold value in each block (hereinafter, the information 22 will be referred to as the low luminance pixel count information 22) are supplied to the microcomputer 14 (described later). Note that [i] and [j] respectively denote the numbers of blocks of one frame as counted in the vertical and horizontal directions.

The microcomputer 14 includes a ROM (Read Only Memory) 15 and controls the operation of the entire imaging apparatus 1 using a RAM (Random Access Memory) as a work memory in accordance with a program and data stored in the ROM 15. For example, in response to an operation performed on the shutter button (not shown), the microcomputer 14 supplies a control signal to the driving unit 16 to control the operation of the shutter and stores captured image data on a storage medium. Furthermore, in accordance with a program, the microcomputer 14 generates tone correction amount information according to which to perform the tone correction on the image data obtained as a result of taking an image and also generates an image taking control signal to control the image taking process so that an image is taken with right exposure.

The data stored in the ROM 15 includes a feature histogram table 15A in which feature histogram data respectively corresponding to one or more typical image patterns is stored and a tone curve table 15B in which tone curves are stored which correspond to respective feature histogram data stored in the feature histogram table 15A. The microcomputer 14 stores, in the RAM, the histogram data 20, the average luminance information 21, and the low luminance pixel count information 22 supplied from the image signal processing unit 12. The microcomputer 14 calculates the amount of tone correction to be made on the image data, using the histogram data 20, the average luminance information 21, and the low luminance pixel count information 22, and also using the feature histogram table 15A and the tone curve table 15B stored in the ROM 15.

More specifically, for example, the microcomputer 14 calculates the similarity of each of the feature histograms stored in the feature histogram table 15A with respect to the feature histogram data 20 supplied from the image signal processing unit 12 and extracts a feature histogram having highest similarity. The microcomputer 14 then selects a tone curve corresponding to the extracted feature histogram from the tone curve table 15B. Furthermore, according to a properly determined adjustment factor, the microcomputer 14 adjusts the selected tone curve indicating the tone correction amount.

Based on the average luminance information 21 supplied from the image signal processing unit 12, the microcomputer 14 modifies the tone adjustment factor determined based on the feature histogram table 15A and the tone curve table 15B. The resultant tone correction amount is supplied to the tone correction unit 13.

According to a gamma curve, the tone correction unit 13 makes a gamma correction on the image data supplied from the image signal processing unit 12 thereby compensating for the characteristic of the image sensor. The tone correction unit 13 then makes the tone correction on the image data in accordance with the tone correction amount supplied from the microcomputer 14 and outputs the resultant image data. Note that the gamma correction based on the gamma curve and the tone correction based on the tone correction amount may be performed separately or may be performed in a single integrated step. The corrected image data output from the tone correction unit 13 is supplied to a storage circuit (not shown) and stored in a storage medium such as a semiconductor memory.

The microcomputer 14 detects a solid black area in the image data based on the low luminance pixel count information 22 supplied from the image signal processing unit 12, and evaluates the detected solid black area to determine whether a luminance correction should be performed. Note that a solid black area appears in an image, for example, when the image of a subject is taken in a dark circumstance in which a small amount of light can be incident on the image sensor, and thus the ratio of the number of low luminance pixels becomes high. An image taken in such a dark circumstance has a generally dark (black) tone, which makes it difficult to perceive details of the image.

If it is determined that the luminance correction should be made, the microcomputer 14 evaluates the distance to the subject measured by a measuring unit (not shown) to determine whether the distance to the subject is within a range in which light emitted from a flash lamp 17 can reach the subject. If the determination is affirmative, the microcomputer 14 issues a flash light emission command to the flash lamp 17.

However, if the distance to the subject is not within the range in which light emitted by the flash lamp 17 can reach the subject, the microcomputer 14 adjusts an exposure value (EV) and/or adjusts the tone correction amount. To make an EV adjustment, the microcomputer 14 commands the driving unit 16 to issue a proper aperture control command and/or a proper shutter speed control command in accordance with an image signal output from the imaging unit 11, the sensitivity of the image sensor, and information associated with the optical system 10 such as aperture control information. In accordance with the command issued by the microcomputer 14, the driving unit 16 controls the aperture and/or the shutter speed. The microcomputer 14 modifies the tone correction adjustment factor based on the low luminance pixel count information 22 supplied from the image signal processing unit 12, and supplies the modified tone correction adjustment factor to the tone correction unit 13.

In the configuration described above, light from the subject is incident on the imaging unit 11 via the optical system 10. The imaging unit 11 converts the incident light into an electrical signal and further converts the electrical signal into image data by performing predetermined processing on the electrical signal. The resultant image data is supplied to the image signal processing unit 12. Based on the supplied image data, the image signal processing unit 12 determines histogram data 20, average luminance information 21, and low luminance pixel count information 22. The determined histogram data 20, the average luminance information 21, and the low luminance pixel count information 22 are supplied to the microcomputer 14.

The microcomputer 14 performs necessary processes such as calculation of the tone correction adjustment factor, issue of the flash light emission command, generation of the image taking control signal to control the aperture and/or the shutter speed, in accordance with the supplied histogram data 20, the average luminance information 21, and the low luminance pixel count information 22, and also in accordance with the feature histogram table 15A and the tone curve table 15B. The calculated tone correction adjustment factor is supplied to the tone correction unit 13. The flash light emission command is supplied to the flash lamp 17. The image taking control signal is supplied to the driving unit 16.

For example, if it is determined to emit flash light based on the low luminance pixel count information 22, the microcomputer 14 issues a flash light emission command to the flash lamp 17. For example, if it is determined to make the EV correction based on the low luminance pixel count information 22, the microcomputer 14 generates the image taking control signal and supplies it to the driving unit 16. In accordance with the supplied image taking control signal, the driving unit 16 generates an aperture control signal to control the aperture and/or a shutter speed control signal to control the shutter speed. The aperture control signal is supplied to the optical system 10. In accordance with the supplied aperture control signal, the optical system 10 controls the aperture to control the amount of incident light. In accordance with the supplied shutter speed control signal, the imaging unit 11 controls the time during which photoelectric conversion is performed by the image sensor.

If a shutter button (not shown) is pressed, the microcomputer 14 issues an image capture command to the imaging unit 11. Herein, if the flash light emission command has been issued, flash light is emitted by the flash lamp 17 in synchronization with the timing of pressing the shutter button. In accordance with the image capture command, the imaging unit 11 converts the incident light into an electrical signal over a time period specified by the shutter speed control signal and performs predetermined signal processing on the obtained electrical signal to convert the electrical signal to image data. The image data is supplied to the image signal processing unit 12. In the image signal processing unit 12, the histogram data 20, the average luminance information 21, and the low luminance pixel count information 22 are generated and supplied to the tone correction unit 13 via the image signal processing unit 12. The tone correction unit 13 makes the tone correction on the supplied image data in accordance with the tone correction adjustment factor and outputs the corrected image data. The image data output from the tone correction unit 13 is stored in a storage medium such as a semiconductor memory.

Now, the feature histogram table 15A and the tone curve table 15B stored in the ROM 15 are described below. In the feature histogram table 15A, one or more histograms corresponding to respective typical image patterns are stored as feature histograms. Note that in the plurality of histograms stored in the feature histogram table 15A, the center luminance value of a range in which the frequency is low varies in steps of predetermined values from one histogram to another. In each histogram, the luminance range from 0% to 100% is divided into N intervals, and the number of occurrences of luminance in each interval is represented as the frequency value of the interval.

Figure 2B:
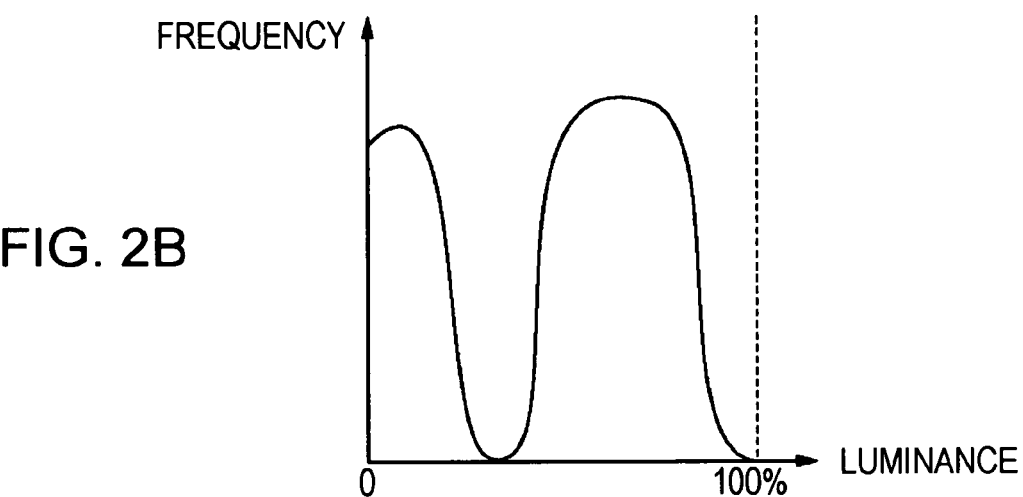
Figure 2C:
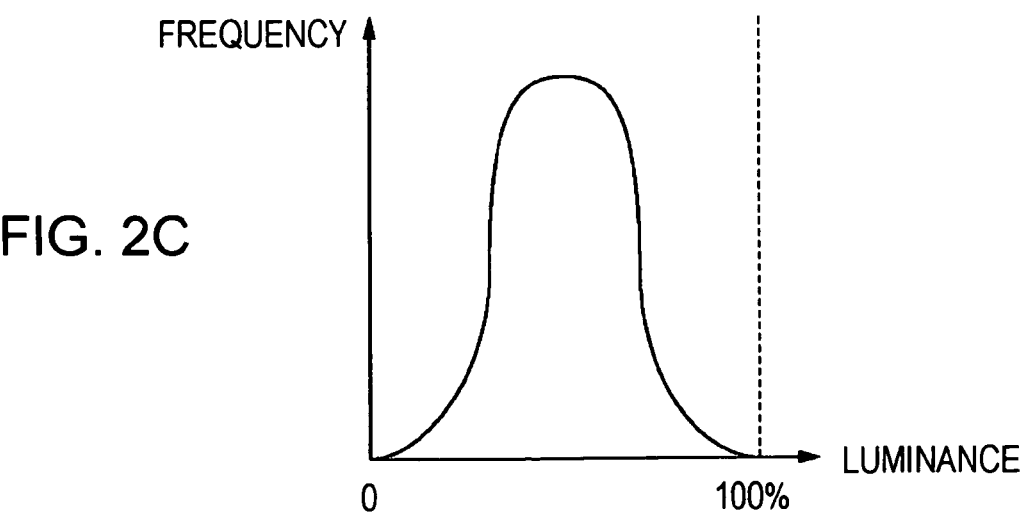

FIGS. 2A to 2C show examples of feature histograms stored in the feature histogram table 15A. More specifically, FIG. 2A shows an example of a feature histogram corresponding to a typical image taken against light. In the feature histogram corresponding to the image taken against light, as shown in FIG. 2A, the frequency is concentrated in a low luminance range and a high luminance range, but the frequency in a middle luminance range (for example, around a 50% luminance level) is low.

FIG. 2B shows an example of a feature histogram corresponding to a typical image with a generally dark tone due to, for example, underexposure. In this example, the frequency is large in a low luminance range (for example, near 0% luminance level) and in a middle luminance range (for example, around a 50% luminance level), but the frequency is low in a range between the low luminance range and the middle luminance range and also in a high luminance range.

FIG. 2C shows an example of a feature histogram corresponding to a typical image of a subject having a relatively uniform luminance distribution and having generally low contrast. In this example, the luminance distribution is concentrated in a middle luminance range (for example, around a 50% luminance level) and the frequency is low in a high luminance range (near a 100% luminance level) and in a low luminance range (near a 0% luminance level).

Figure 3A:
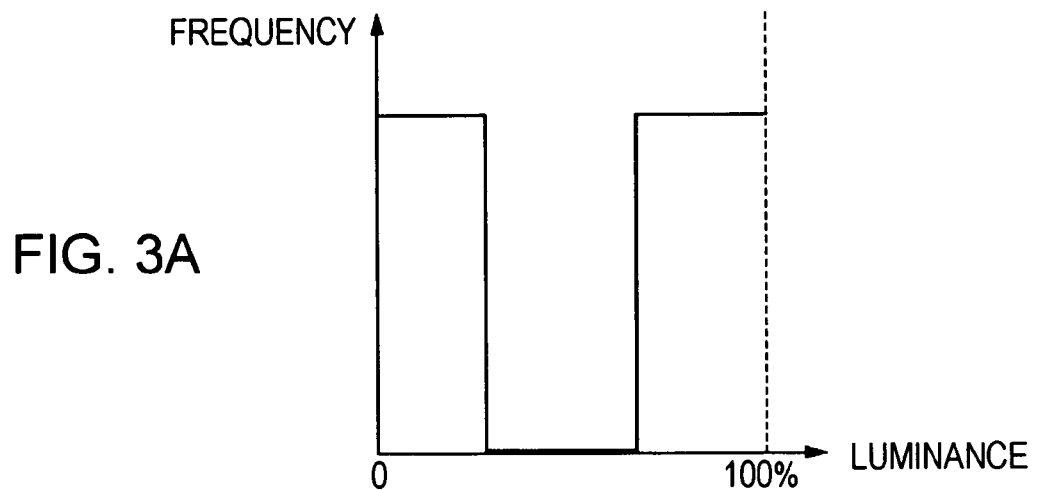
FIGS. 3A to 3C are graphs showing examples of feature histograms stored in a feature histogram table.
Figure 3B:
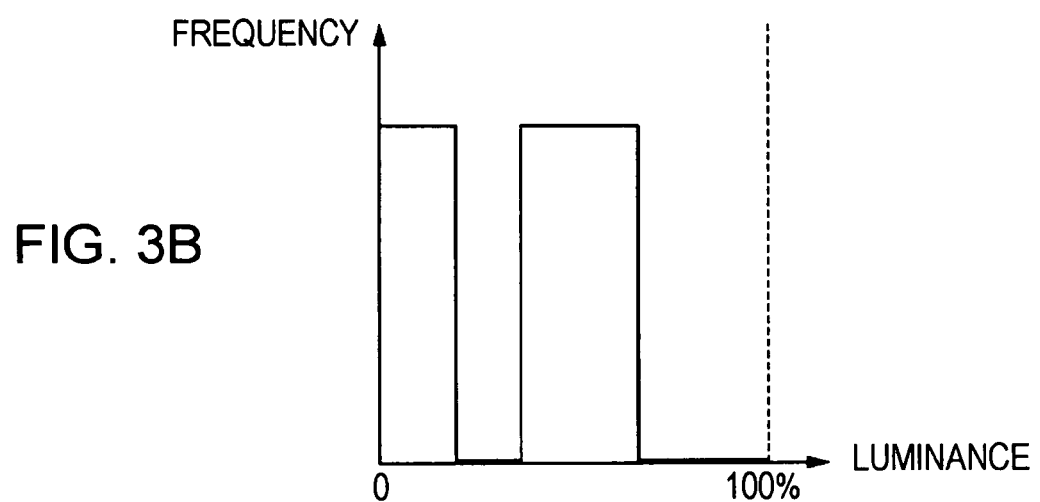
Figure 3C:
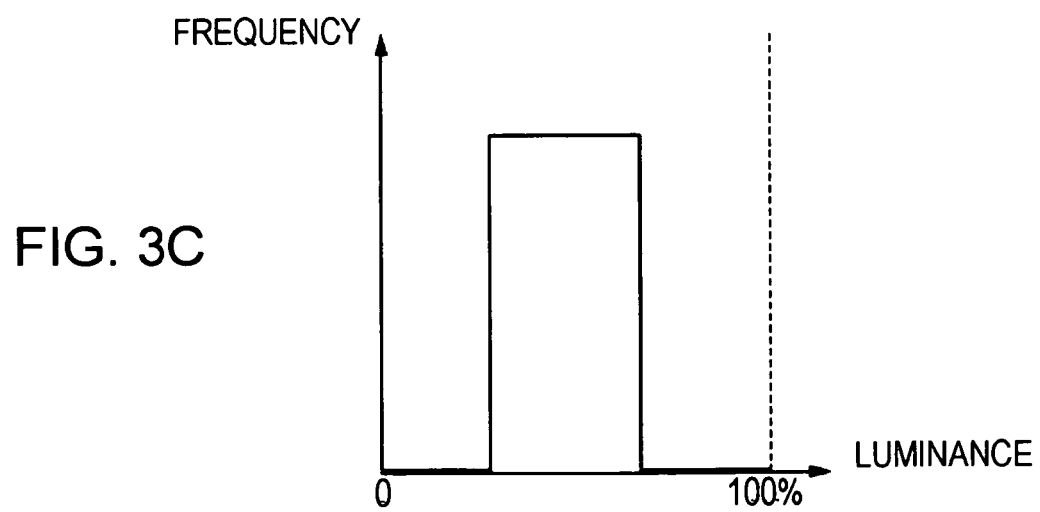

In the examples shown in FIGS. 2A to 2C, the feature histograms are expressed in rounded shapes. Note that feature histograms may be expressed in other ways. For example, the feature histograms may be expressed by simple polygonal lines as shown in FIGS. 3A to 3C and may be stored in the feature histogram table 15A. FIG. 3A corresponds to FIG. 2A, FIG. 3B corresponds to FIG. 2B, and FIG. 3C corresponds to FIG. 2C. In the case in which the feature histograms are expressed by simple polygonal lines, it is possible to represent the feature histograms in simple mathematical expressions. This allows a great reduction in the data size of the feature histograms stored in the ROM 15.

The tone curve table 15B includes tone curves respectively corresponding to one or more feature histograms stored in the feature histogram table 15A. The tone curves stored in the tone curve table 15B are standard tone curves which are determined such that when image data having a particular feature histogram is tone-corrected using a tone curve corresponding to the particular feature histogram, the resultant image data has an ideal tone.

Figure 4A:
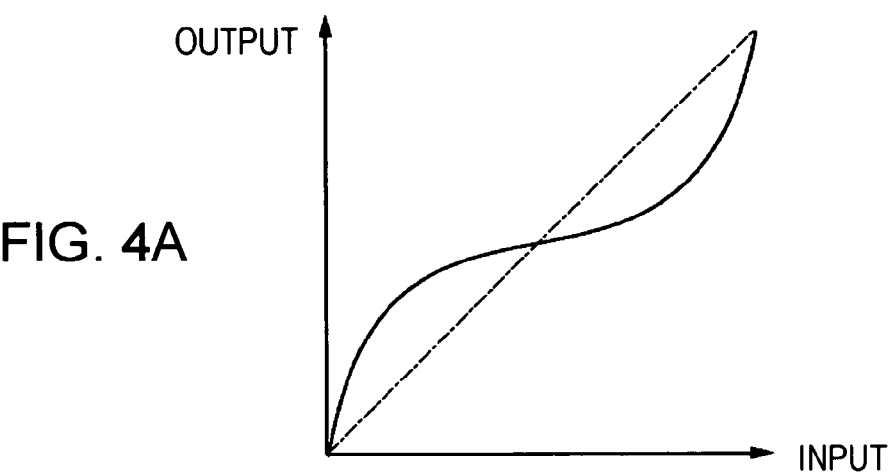
FIGS. 4A to 4C are graphs showing examples of tone curves stored in a tone curve table.
Figure 4B:
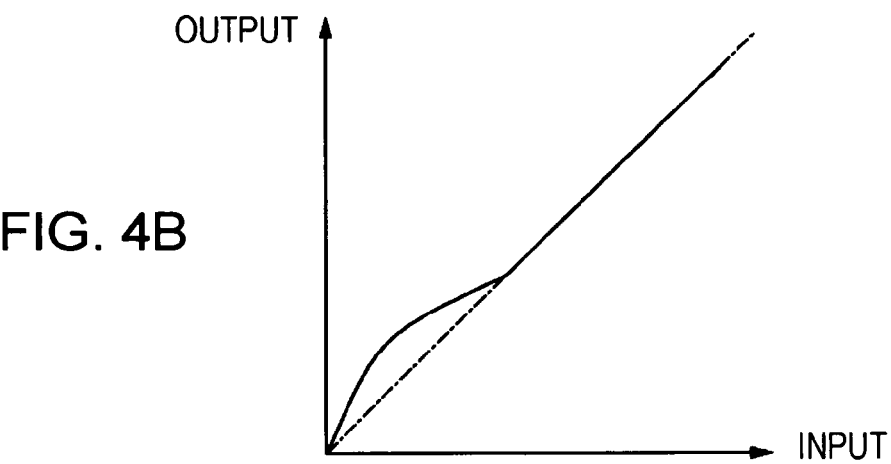
Figure 4C:
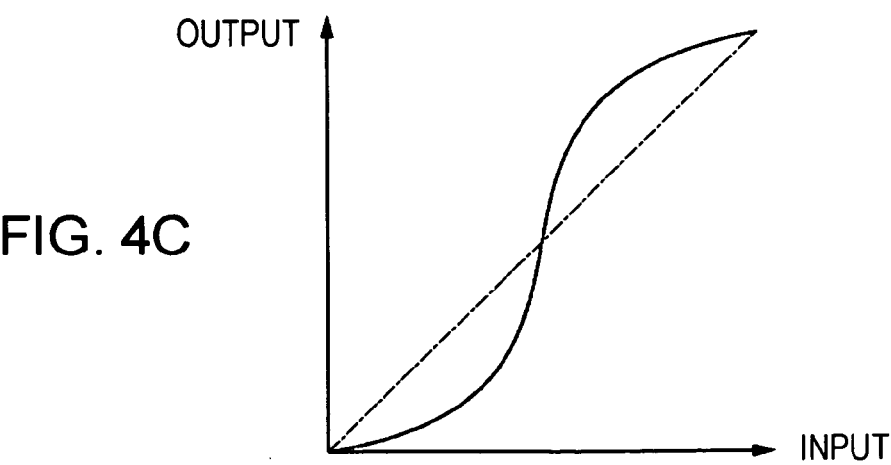

FIGS. 4A to 4C show examples of tone curves stored in the tone curve table 15B. Note that in these figures, tone curves are represented by solid lines. FIG. 4A shows an example of a tone curve corresponding to a feature histogram (such as that shown in FIG. 2A or FIG. 3A) corresponding to a typical image taken against light. When a given image data has a luminance distribution similar to a feature histogram such as that shown in FIG. 2A or 3A having low frequencies in a middle luminance range and high frequencies in low and high luminance ranges, if a tone correction is made on the given image data using an S-shaped tone curve, such as that shown in FIG. 4A, which is convex in a low luminance range and concave in a high luminance range, then the luminance of low luminance pixels of the image data is increased and the luminance of high luminance pixels is reduced, and thus the total image quality is improved.

FIG. 4B shows an example of a tone curve corresponding to a feature histogram (such as that shown in FIG. 2B or FIG. 3B) corresponding to a typical image with low luminance over the entire image. When given image data has a luminance distribution similar to a feature histogram such as that shown in FIG. 2B or 3B having low frequencies in a range between a low luminance range and a middle luminance range, if a tone correction is made on the given image data using a tone curve, such as that shown in FIG. 4B, which is convex in a low luminance range, then the luminance of low luminance pixels of the image data is increased, and thus the resultant image data becomes generally brighter compared with the original image data.

In the present embodiment, a tone curve such as that shown in FIG. 4B, which causes little change in the input-output characteristic in a high luminance range in which the frequency is low, is used for a feature histogram such as that shown in FIG. 2B or FIG. 3B having low frequencies in the high luminance range. Use of such a tone curve allows image data having luminance distribution similar to a feature histogram having low frequencies in the high luminance range to be corrected so as to have a right tone and have properly increased luminance.

FIG. 4C shows an example of a tone curve corresponding to a feature histogram, such as that shown in FIG. 2C or 3C, corresponding to a typical image with low contrast taken for a subject having a relatively uniform luminance distribution. If a tone correction using a tone curve such as that shown in FIG. 4C being concave in a low luminance range and convex in a high luminance range is applied to image data having a luminance distribution with high frequency in low and high luminance ranges similar to the feature histogram shown in FIG. 2C or 3C, pixel values in the low luminance range are decreased (that is, become further lower) while pixel values in the high luminance range are increased (that is, become further higher), and thus the contrast is improved.

In the tone curve table 15B, tone curves such as those described above are stored in the form of tone curve tables Gp corresponding to the feature histograms stored in the feature histogram table 15A.

Figure 5:
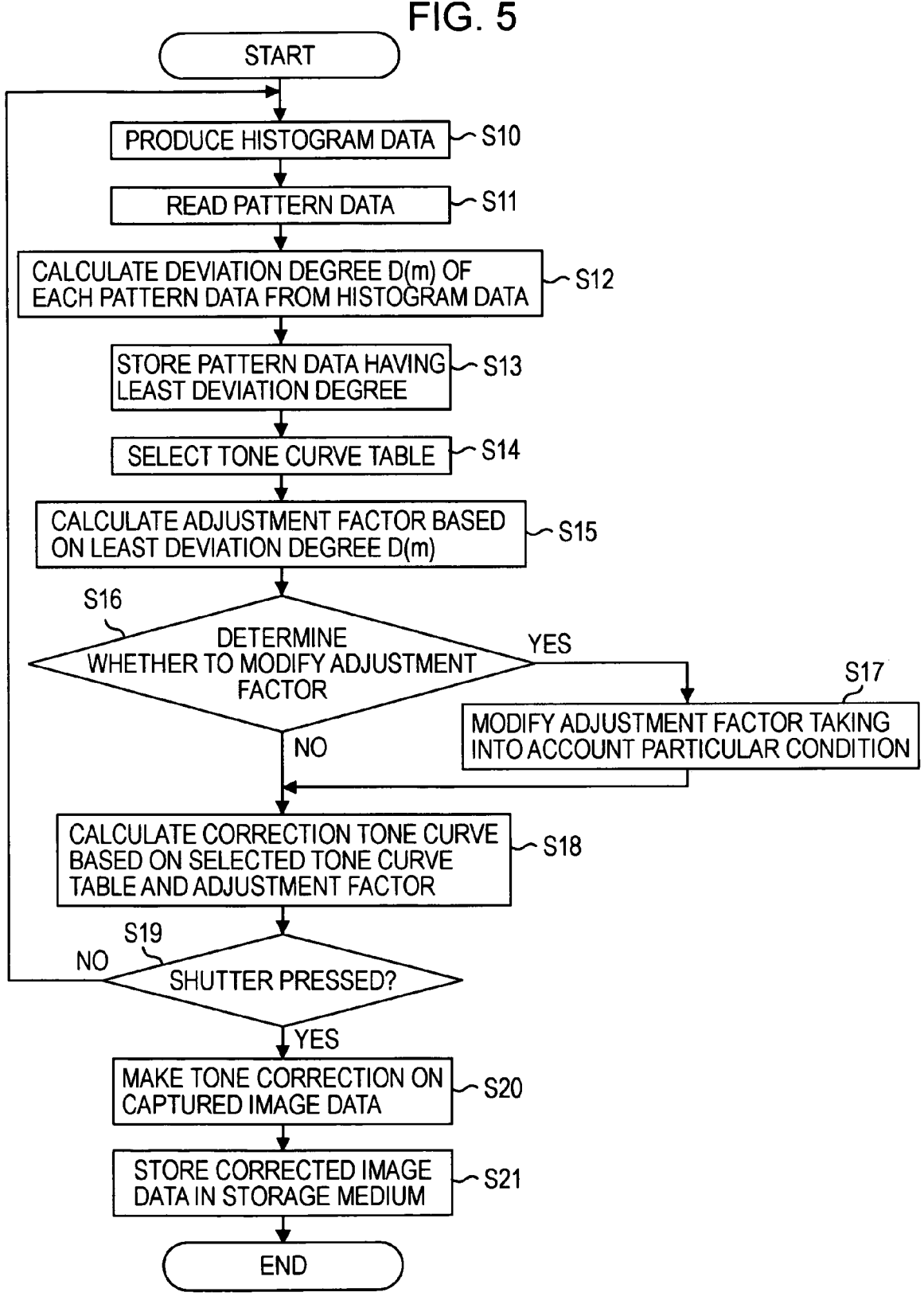
FIG. 5 is a flow chart showing an example of an image taking process according to an embodiment of the present invention.

Now, with reference to a flow chart shown in FIG. 5, an example of an image taking process performed by the imaging apparatus 1 according to an embodiment of the present invention is described below. Note that the process shown in the flow chart of FIG. 5 is performed by the microcomputer 14 by controlling various parts of the imaging apparatus 1 according to the program stored in the ROM 15. Also note that in the processing flow shown in FIG. 5, steps S10 to S19 are performed periodically at intervals of, for example, 1/60 sec until the shutter button of the imaging apparatus 1 is pressed.

In step S10, the image signal processing unit 12 produces histogram data based on the image data (assumed to be image data P, in this specific example) supplied from the imaging unit 11. More specifically, the luminance value of each pixel is determined for one frame of image data, and frequencies of respective luminance values are calculated. The calculated histogram data is expressed as H(n), where an argument n indicates a luminance level and takes a value 1, 2, . . . , N. Herein, N is the number of intervals into which the full range of luminance is divided. For example, if the luminance is expressed in 8 bits, then N=256 and thus the luminance is expressed in 256 levels. The histogram data H(n) is stored in a RAM (not shown) connected to the microcomputer 14.

In step S11, the microcomputer 14 reads all feature histogram data stored in the feature histogram table 15A. Herein, the read feature histogram data is denoted as T(m)(n), where an argument m takes a value 1, 2, . . . , M pointing to a particular feature histogram data stored in the feature histogram table 15A. In the examples shown in FIGS. 2A to 2C or FIGS. 3A to 3C, M=3, and m=1 points to the feature histogram pattern shown in FIG. 2A or FIG. 3A, m=2 points to the feature histogram pattern shown in FIG. 2B or FIG. 3B, and m=3 points to the feature histogram pattern shown in FIG. 2C or FIG. 3C.

In step S12, the similarity of the histogram data H(n) calculated in step S10 with respect to the respective feature histogram data T(1)(n), T(2)(n), . . . , T(M)(n) read in step S11 from the feature histogram table 15A are calculated as D(1), D(2), . . . , D(M). The similarity D(m) is calculated, for example, according to formula (1). Note that D(m) given by formula (1) indicates the degree of difference of the histogram data H(n) from the feature histogram data T(m)(n), and thus the similarity is high when D(m) is small. In this sense, hereinafter, D(m) will be referred to as the deviation degree indicating the similarity or more simply as the deviation degree.

$$Dm = \sum_{n=1}^{N} Sub(m)(n) \qquad (1)$$

where Sub(m)(n) is the difference between the weighted histogram values in respective intervals of the histogram data H(n) of the image data P and the feature histogram data. Sub(m)(n) may be calculated, for example, according to formula (2) described below.

$$Sub(m)(n) = \begin{cases} \{T(m)(n) - H(n)\} \times W_1(m)(n) & \ldots \quad T(m)(n) > H(n) \\ 0 & \ldots \quad T(m)(n) < H(n) \end{cases} \qquad (2)$$

wherein W1(m)(n) is a weighting factor assigned to a feature histogram pattern pointed to by an argument (m).

Meanings of formulas (1) and (2) are described in detail below with reference to FIG. 6. Note that it is assumed herein by way of example that the feature histogram data T(m)(n) has a luminance distribution expressed by simple polygonal lines and has a low frequency in a middle luminance range, such as that shown in FIG. 3A.

The feature histogram data T(m)(n) read from the feature histogram table 15A is compared with the histogram data H(n) calculated from the image data P. For intervals of the histogram data H(n) with frequencies lower than those of the feature histogram data T(m)(n) (for intervals corresponding to portions D shaded with dots in FIG. 6), Sub(m)(n) is given as Sub(m)(n)=0 according to formula (2). On the other hand, for intervals of the histogram data H(n) with frequencies higher than those of the feature histogram data T(m)(n) (for intervals corresponding to portions v shaded with oblique lines in FIG. 6), Sub(m)(n) is given by a product of Sub(m)(n) and a weighting factor W1(m)(n) according to formula (2). Thereafter, the deviation degree D(m) indicating the similarity is determined by calculating the sum of respective terms Sub(m)(n) determined in the above-described manner is calculated with respect to N according to formula (1). Note that the weighting factors W1(m)(n) are stored in the ROM 15 or the like.

In next step S13, the least deviation degree Dmin indicating highest similarity is then retrieved from the deviation degrees D(1), D(2), ..., D(M) calculated in step S12. The argument m of the deviation degree D(m) having the retrieved least deviation degree Dmin is then employed as a pattern number Ptn_Num of the image data P from which the histogram data H(n) was produced. For example, if D(1)>D(2)>D(3), then D(3) is retrieved as the least deviation degree Dmin, and the pattern number Ptn_Num is determined as 3.

The pattern number Ptn_Num is stored in a RAM (not shown) connected to the microcomputer 14 or in a register or the like of the microcomputer 14.

In step S14, the microcomputer 14 refers to the tone curve table 15B according to the pattern number Ptn_Num and reads a tone curve table Gp representing a most suitable tone curve from the tone curve table 15B. Note that the read tone curve table Gp represents a tone curve according to which to make a tone correction on the image data P.

Figures 6, 7:
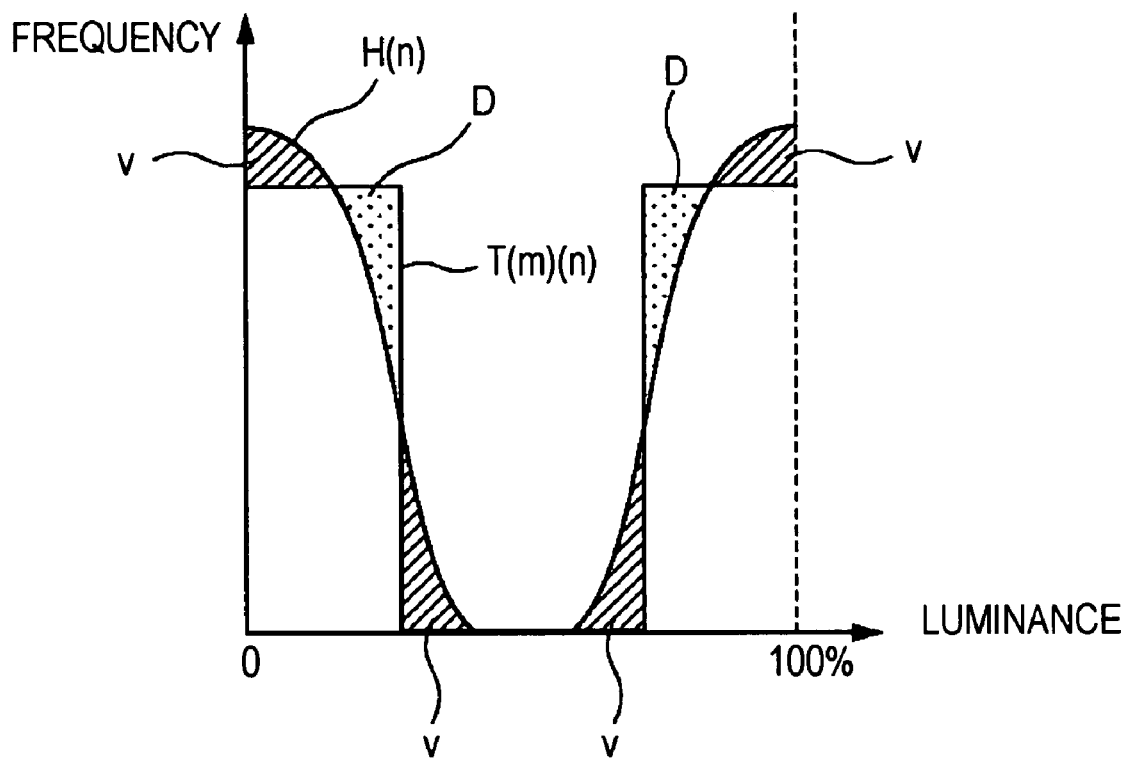
FIG. 6 is a graph showing a manner in which a deviation degree D(m) is calculated.
FIG. 7 is a table indicating the relationship among feature histogram data T(m), a pattern number Ptn_Num, and a tone curve G(m)

For example, as shown in FIG. 7, an argument m of each feature histogram T(m) is assigned as a pattern number Ptn_Num of the feature histogram T(m), and the pattern number Ptn_Num is also assigned to a tone curve G(m) with the argument m corresponding to the feature histogram T(m).

In the next step S15, the tone correction adjustment factor gmAmp for the image data P is calculated using the least deviation degree Dmin determined in step S3. The tone correction adjustment factor gmAmp is calculated, for example, according to formula (3).

$$gmAmp = \begin{cases} 1 & \ldots \quad D_{min} \leq DIF\_L \\ \frac{-D_{min} + DIF\_H}{DIF\_H - DIF\_L} & \ldots \quad DIF\_L < D_{min} < DIF\_H \\ 0 & \ldots \quad D_{min} \geq DIF\_H \end{cases} \quad (3)$$

where DIF_L is a lower threshold value and DIF_H is a higher threshold value defined for the least deviation degree Dmin.

Figure 8:
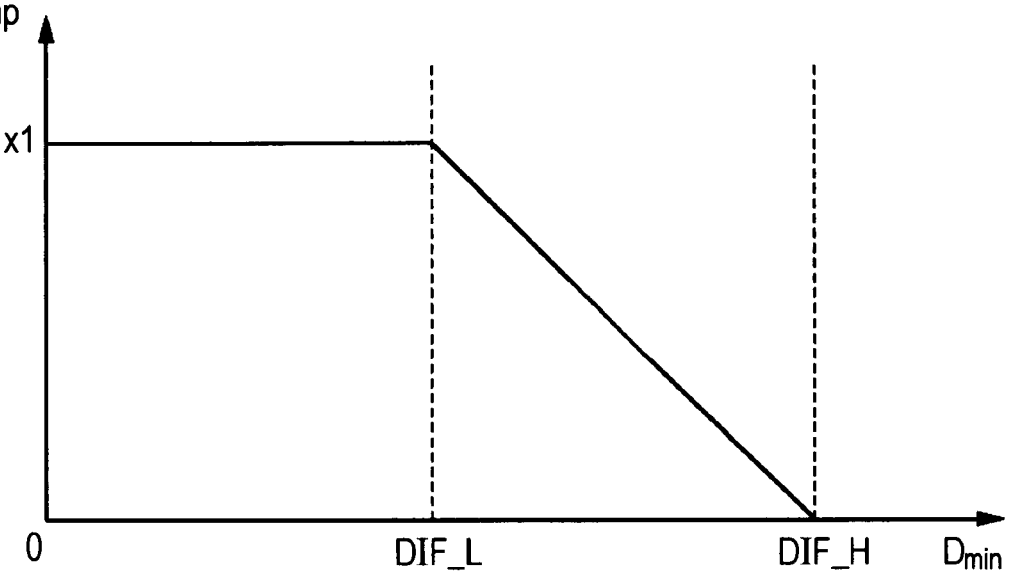
FIG. 8 is a graph showing an example of the relationship between a minim deviation degree Dmin and tone correction adjustment factor gmAmp.

According to formula (3), as shown in FIG. 8, when the least deviation degree Dmin is smaller than the lower threshold value DIF_L, the tone correction adjustment factor gmAmp is set to be equal to 1. On the other hand, when the least deviation degree Dmin is greater than the higher threshold value DIF_H, the tone correction adjustment factor gmAmp is set to be equal to 0. In the range between the threshold value DIF_L and the threshold value DIF_H, the tone correction adjustment factor gmAmp varies from 1 to 0. The selected tone curve is modified according to the tone correction adjustment factor gmAmp as will be described in detail later.

In step S16, it is determined whether to modify the tone correction adjustment factor taking into account other factors such as a scene mode (image taking operation mode), specifications of the imaging apparatus, etc. The scene mode refers to an image taking operation mode in which an image is taken under conditions predetermined according to the type of a subject or an environment in which the image of the subject is taken. A plurality of scene modes are prepared for predicted subject types or environments. A user is allowed to select a particular one of available scene modes according to a subject to be taken and/or an environment in which to take the subject. This makes it possible to easily obtain high quality image data simply by selecting a proper scene mode.

By way of example, the modification of the tone correction adjustment factor is described below for a case in which the solid black area correction is made. In a case in which an image is taken in a landscape mode for taking a landscape image, it is reasonable not to perform solid black area processing which will be described later. On the other hand, for an image taken in a portrait mode, it is desirable to perform the solid black area processing.

In this case, the determination in step S16 as to whether to modify the tone correction adjustment factor according to the scene mode is made such that if the landscape mode is selected as the scene mode, the determination is made such that modification of the tone correction adjustment factor should not be made, but if the portrait mode is selected as the scene mode, the determination is made such that modification of the tone correction adjustment factor should be made.

In step S16 described above, when it is determined that the tone correction adjustment factor should be modified taking into account other conditions, an upper or lower limit may be defined depending on the scene mode such that the tone correction adjustment factor is modified within the range lower than the upper limit or higher than the upper limit.

In a case in which specifications of the imaging apparatus are taken into account as other conditions, if the imaging apparatus has high performance and thus if the noise level of the imaging apparatus is low enough, it may be allowed to determine that the modification of the tone correction adjustment factor based on the ISO value (described later) is not made. More specifically, it may be allowed to determine not to modify the tone correction adjustment factor based on the ISO value for a high-performance apparatus, while it may be allowed to determine to modify the tone correction adjustment factor based on the ISO value for a low-price apparatus with low performance.

Note that the determination in step S16 may be made in different ways. For example, the determination as to whether to modify the tone correction adjustment factor may be made according to the value of the tone correction adjustment factor gmAmp itself. For example, if the least deviation degree Dmin is smaller than the lower threshold value DIF_L (that is, if the tone correction adjustment factor gmAmp=1), the feature histogram data T(m) determined as having the least deviation degree Dmin can be regarded as being completely or substantially the same as the histogram data H of the present image data P. In this case, the image data P can be rightly corrected using the tone curve table Gp corresponding to the feature histogram data (m).

On the other hand, if the least deviation degree Dmin is in the range between the lower threshold value DIF_L and the higher threshold value DIF_H (that is, if 0<tone correction adjustment factor gmAmp<1), the feature histogram data T(m) determined as having the least deviation degree Dmin can be regarded as being similar to the histogram data H of the present image data P to a degree corresponding to the least deviation degree Dmin. In this case, the tone curve table Gp corresponding to the feature histogram data T(m) is modified by a factor given by the tone correction adjustment factor gmAmp, and the tone correction on the image data P is made based on the modified tone curve table Gp thereby obtaining rightly corrected image data P.

If the least deviation degree Dmin is greater than the higher threshold value DIF_H (that is, if tone correction adjustment factor gmAmp=0), the feature histogram data T(m) determined as having the least deviation degree Dmin is regarded as being not similar to the histogram data H of the present image data P. In this case, the tone curve table Gp corresponding to the feature histogram data (m) is regarded as being not suitable for use to make the tone correction on the present image data P.

If it is determined in step S16 that the tone correction adjustment factor gmAmp should be modified taking into account other factors, the process proceeds to step S17. In step S17, the tone correction adjustment factor gmAmp is modified by an amount determined according to particular factors, as will be explained in further detail later. After the modification of the tone correction adjustment factor gmAmp, the process proceeds to step S18.

Note that step S17 may be unconditionally performed without performing the determination process in step S16. In this case, after step S15, the process proceeds directly to step S17 without performing the determination in step S16, and the process proceeds to step S18 after the process in step S17 (described later) is completed.

On the other hand, if the determination in step S16 is that the tone correction adjustment factor gmAmp is not modified taking into account other factors, it is determined that the tone correction on the present image data P should be performed using the tone curve table Gp corresponding to the feature histogram data T(m), and the process proceeds to step S18.

In step S18, the adjusted tone curve G(k) representing the output luminance as a function of the input luminance k is calculated using the tone curve table Gp selected in step S14 and using the tone correction adjustment factor gmAmp determined in step S15 or the tone correction adjustment factor gmAmp modified in step S17. More specifically, the adjusted tone curve G(k) is calculated, for example, in accordance with formula (4) which defines the modification of the tone correction adjustment factor gmAmp obtained according to formula (3).

$$G(k)=\text{Line}(k)+(Gp(k)-\text{Line}(k))\times gmAmp \quad (4)$$

where Line(k) is a properly determined linear function. The obtained adjusted tone curve G(k) is supplied to the tone correction unit 13.

Figure 9:
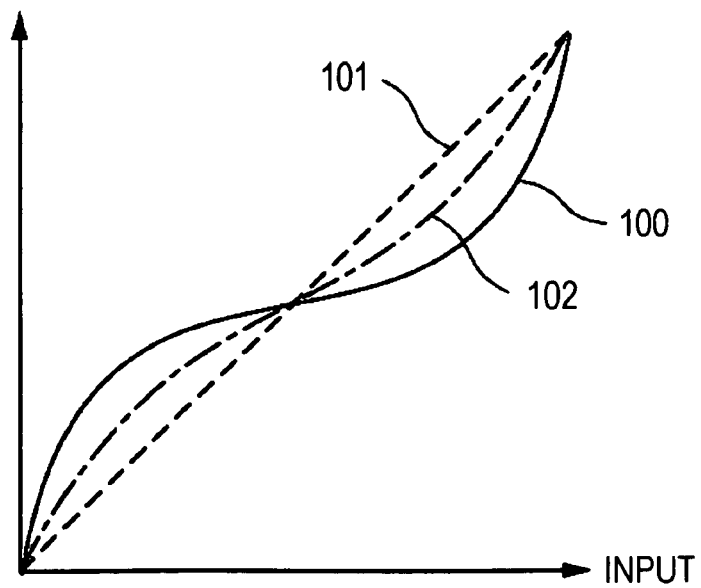
FIG. 9 is a graph showing a manner in which a tone curve is adjusted according to a tone correction adjustment factor gmAmp.

The adjustment of the tone curve according to the tone correction adjustment factor gmAmp is described in further detail below with reference to FIG. 9. FIG. 9 shows an example of a manner in which the tone curve corresponding to a pattern number Ptn_Num=1 (FIG. 3A) given as the standard tone curve is adjusted by an amount specified by the tone correction adjustment factor gmAmp. The tone curve can be modified depending on the tone correction adjustment factor gmAmp within the range between a tone curve 101 modified by a factor of 0 (that is, with no modification) and the standard tone curve 100. In FIG. 9, reference numeral 102 denotes a tone curve modified by a factor of x (x=0.6 in the example shown in FIG. 9) in the middle between the tone curve 101 and the standard tone curve 100.

After the adjusted tone curve G(k) is determined, the process proceeds to step S19. In step S19, it is determined whether the shutter button has been pressed. The determination as to whether the shutter button has been pressed may be performed at a proper time within a period from step S10 to S18. If the determination is that the shutter button has not been pressed, the process returns to step S10.

If the determination in step S19 is that the shutter button has been pressed, the process proceeds to step S20. In step S20, the tone correction process is performed on the captured image data using the tone correction adjustment factor gmAmp finally determined in the previous steps.

That is, if the shutter button is pressed, light from the subject is incident on the imaging unit 11 for a time period determined by the shutter mechanism. The imaging unit 11 converts the incident light into an electrical signal and produces image data therefrom. The image data is supplied to the tone correction unit 13 via the image signal processing unit 12. The tone correction unit 13 performs the tone correction process on the supplied image data according to the adjusted tone curve G(k) After the tone correction process is completed, the resultant corrected image data is output from the tone correction unit 13 are stored on a storage media such as a semiconductor memory by a storage unit (not shown) (step S21).

Figure 10:
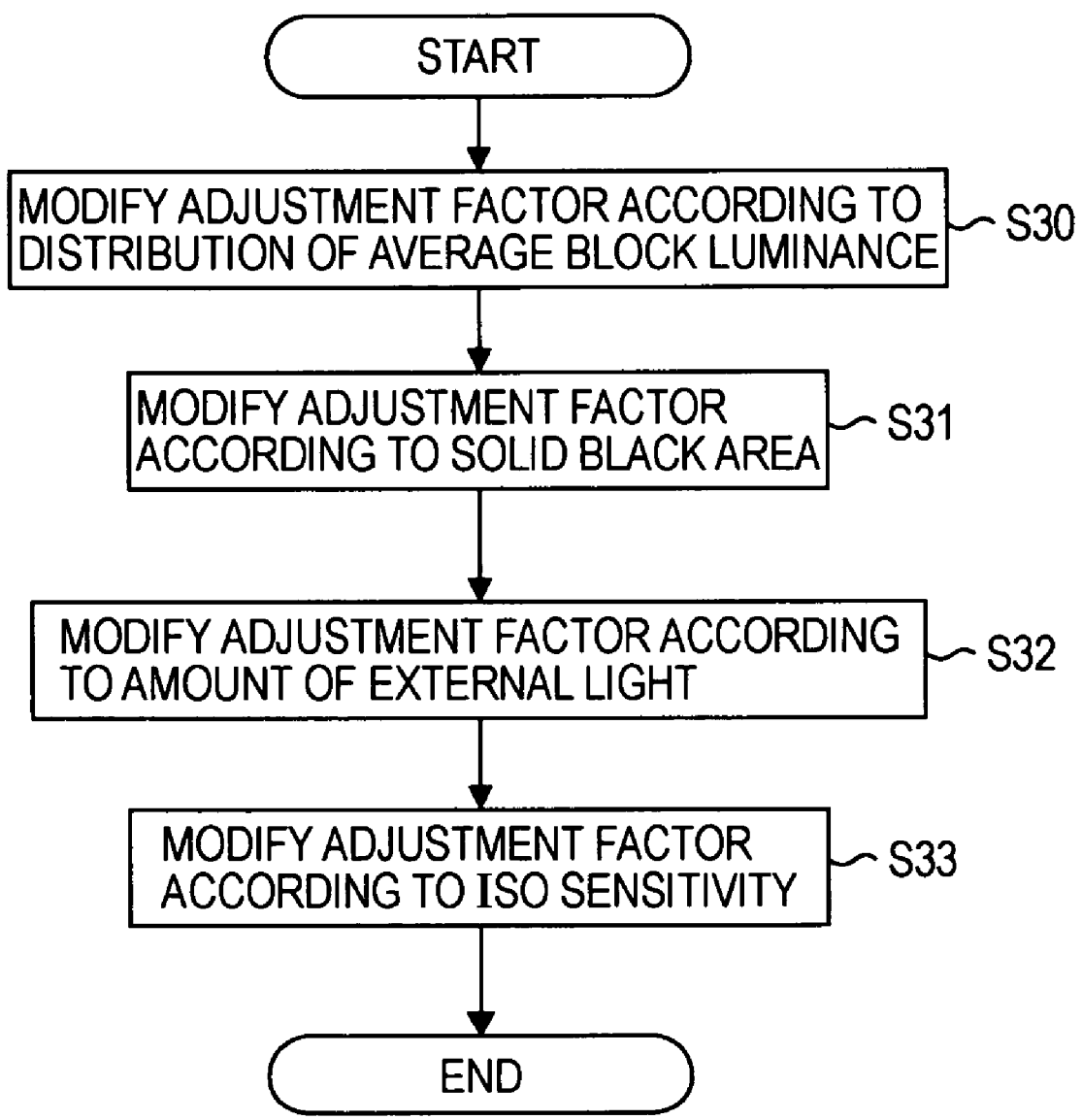
FIG. 10 is a flow chart showing a process of changing a tone correction adjustment factor gmAmp into a value determined depending on particular conditions.

The process in step S17 described above is explained in further detail below. In step S17, the tone correction adjustment factor gmAmp is modified according to a plurality of conditions. FIG. 10 shows a specific example of the process performed in step S17. That is, in the example shown in FIG. 10, the tone correction adjustment factor gmAmp is modified in steps S30 to S33 according to four conditions. Note that steps S30 to S33 shown in FIG. 10 may be performed in an arbitrary order.

In step S30, the tone correction adjustment factor gmAmp is modified according to the average luminance of respective blocks of a frame of image data and the average luminance over the entire frame. In step S31, the number of pixels with luminance lower than the predetermined value is counted for each block of the frame, and information associated with a solid black area is calculated based on the numbers of low luminance pixels. Based on the calculated information associated with the solid black area, the tone correction adjustment factor gmAmp is modified and/or a flash light emission command is issued to the flash lamp 17, as required. In step S32, the tone correction adjustment factor gmAmp is adjusted according to the amount of external light. In this step, the amount of external light may be determined, for example, based on the f-stop number, the shutter speed, the AGC control value, and the luminance level of the image data. In step S33, the tone correction adjustment factor gmAmp is adjusted according to the ISO (International Organization for Standardization) sensitivity.

In this step, the ISO sensitivity is given by converting the sensitivity of the image sensor of the imaging unit 11 into a value equivalent to the ISO sensitivity. The sensitivity of the image sensor is set in accordance with a command issued by the microcomputer 14 to the imaging unit 11.

In the example described above, in step S16 of the flow chart shown in FIG. 5, a determination is made as to whether to modify the tone correction adjustment factor taking into account other conditions. For example, when the determination as to whether to modify the tone correction adjustment factor is made taking into account the scene mode (the image taking operation mode) to correct the solid black area, in accordance with this determination result, the determination is made as to whether to perform step S31 shown in FIG. 10. In the case in which the determination as to whether to modify the tone correction adjustment factor is made based on the ISO sensitivity taking into account the specifications of the apparatus, in accordance with this determination result, the determination is made as to whether to perform step S33 shown in FIG. 10. In the process shown in the flow chart of FIG. 10, it is desirable to perform steps S30 and S32 unconditionally regardless of the result of the determination in step S16 in FIG. 5.

Steps S30 to S33 shown in FIG. 10 are described in further detail below.

First, the process performed in step S30 based on the average luminance of the image data is described with reference to a flow chart shown in FIG. 11. In advance to the process shown in the flow chart of FIG. 11, a given frame of image data is divided into blocks. FIGS. 12A and 12B show an example of a manner in which image data is divided into blocks. FIG. 12A shows an example of one frame of image data, and FIG. 12B shows an example of a manner in which the one frame of image data is divided into I blocks in a vertical direction and J blocks in a horizontal direction and thus the one frame is divided into a total of I×J blocks. In the specific example shown in FIG. 12B, I=5 and J=5. Hereinafter, respective blocks are denoted by R[i] [j] where arguments i and j (i=1, 2, ..., I, j=1, 2, ..., J) point to a particular block.

Although in the example shown in FIG. 12, one frame of image data is equally divided in vertical and horizontal directions, it is not necessarily needed to equally divide one frame. For example, division may be made such that blocks in a central area are greater than blocks in the other areas, or such that blocks in a particular specified area are greater than blocks in the other areas.

Figure 11:
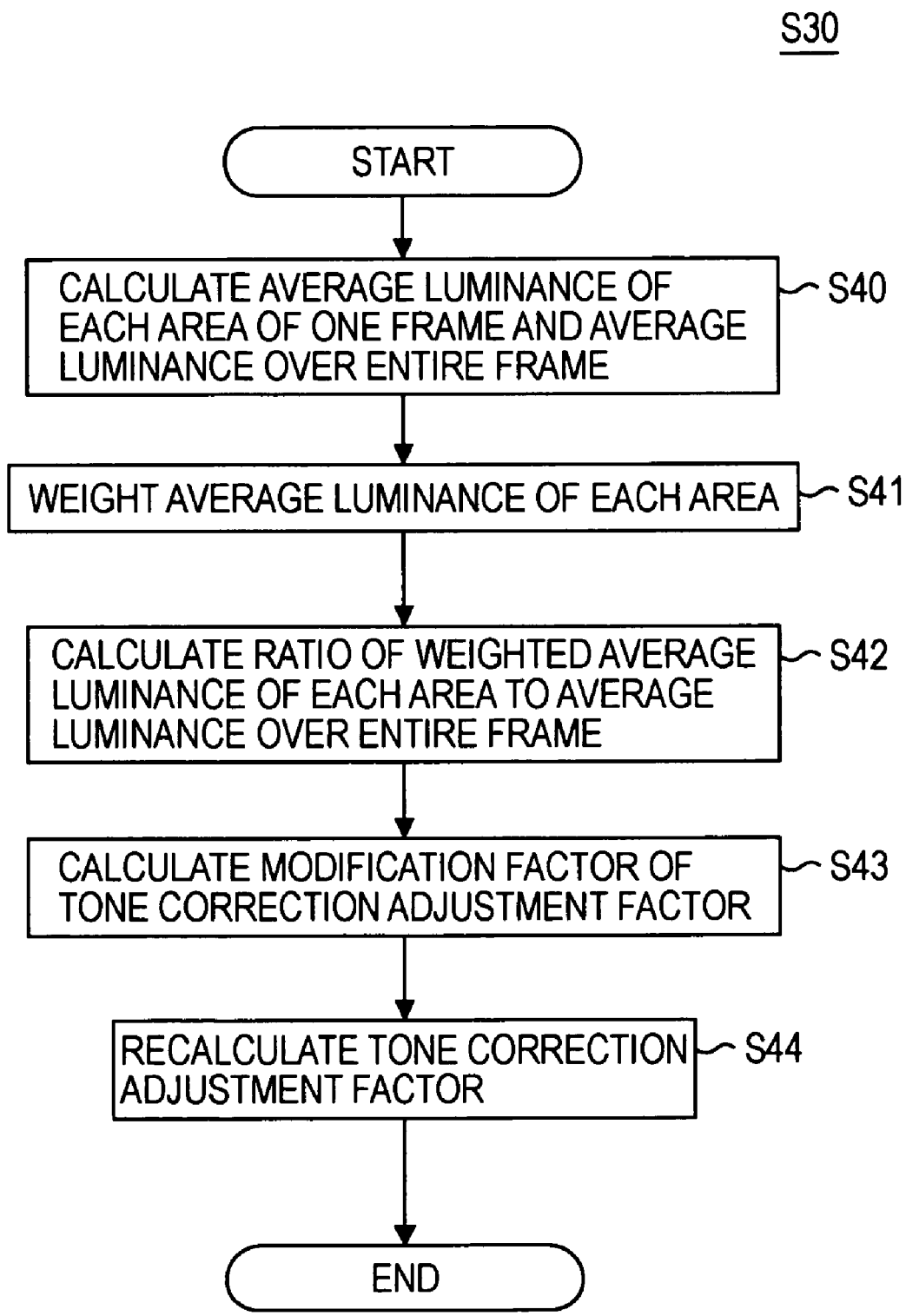
FIG. 11 is a flow chart showing an example of a process using the average luminance of image data.
Figures 12A, 12B:
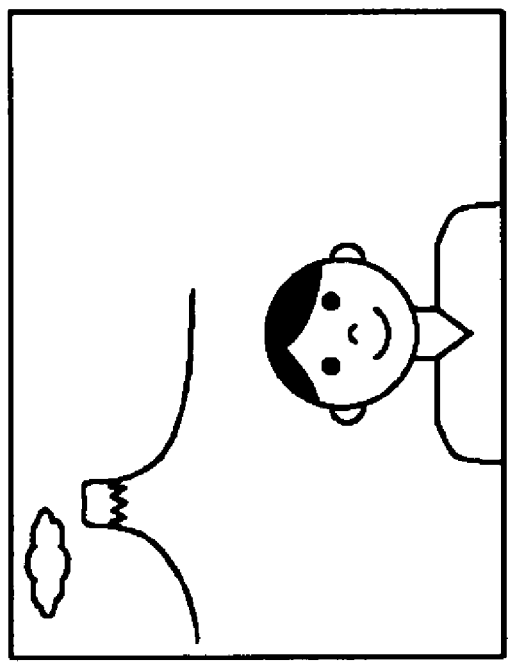
FIGS. 12A and 12B show an example of a manner in which image data is divided.

Referring again to the flow chart shown in FIG. 11, in step S40, the microcomputer 14 reads the average luminance Y[i] [j] of each block R[i] [j] and the average luminance Yave over the entire frame from the RAM. Note that as described above, the average luminance Y[i] [j] of each block R[i] [j] and the average luminance Yave over the entire frame are calculated in advance by the image signal processing unit 12, supplied as average luminance information 21 to the microcomputer 14, and stored in the RAM.

In step S41, according to formula (5), the microcomputer 14 weights the average luminance Y[i] [j] of each block R[i] [j], calculates the average value of weighted average luminance Y[i] [j] of respective blocks R[i] [j], and stores the result as weighted average luminance Yw_ave in a register or a memory.

$$Y_{w\_ave} = \frac{\sum_{i,j} Y[i][j] \times W_2[i][j]}{\sum_{i,j} W_2[i][j]} \quad (5)$$

Note that W2[i] [j] in formula (5) denotes a weight assigned to a block R[i] [j].

In step S42, the ratio Ry of the weighted average luminance Yw_ave to the average luminance Yave is calculated in accordance with formula (6) described below.

$$Ry = Y_{w\_ave}/Yave \quad (6)$$

In step S43, the modification factor Adj1 of the tone correction adjustment factor gmAmp is calculated based on the ratio Ry determined in step S42 in accordance with, for example, formula (7) described below.

$$Adj_1 = \begin{cases} E & \ldots \quad R_y < CK\_L2 \\ -\frac{E-1}{CK\_L1 - CK\_L2} R_y + \\ \frac{E \times CK\_L1 - 2 \times E \times CK\_L2}{CK\_L1 - CK\_L2} & \ldots \quad CK\_L2 < R_y < CK\_L1 \\ 1 & \ldots \quad CK\_L1 < R_y < CK\_H2 \\ -\frac{1}{CK\_H1 - CK\_H2} R_y + \\ \frac{CK\_H1}{CK\_H1 - CK\_H2} & \ldots \quad CK\_H2 < R_y < CK\_H1 \\ 0 & \ldots \quad R_y > CK\_H1 \end{cases} \quad (7)$$

where CK_L2, CK_L1, CK_H2, and CK_H1 are predetermined threshold values.

In step S44, after the calculation of the modification factor Adj1 is completed, the tone correction adjustment factor gmAmp is adjusted using the modification factor Adj1 according to formula (8).

gmAmp (after adjustment)=gmAmp (before adjustment)×Adj1 (8)

FIG. 13 shows an example of the modification factor Adj1 determined as a function of the luminance ratio Ry according to formula (7). When the luminance ratio Ry is equal to or greater than the predetermined threshold value CK_H1, blocks weighted by great weighting factors have a very large number of high luminance pixels. Therefore, when the luminance ratio Ry is equal to or greater than CK_H1, the tone correction adjustment factor gmAmp is set to be equal to 0 as shown in FIG. 13 so that the tone correction using the tone curve GP is not performed. On the other hand, when the luminance ratio Ry is equal to or smaller than the predetermined threshold value CK_L2, blocks weighted by great weighting factors have a very large number of low luminance pixels. Therefore, when the luminance ratio Ry is equal to or smaller than CK_L2, the tone correction adjustment factor gmAmp is set to be greater than 1 as shown in FIG. 13 so that the tone correction in step S30 is further enhanced.

Thus, as described above, the tone correction adjustment factor is adaptively set for weighted blocks such that the adjustment factor of the tone curve is set to be small for blocks having adequate luminance levels thereby obtaining a good luminance tone.

The weight W2[i] [j] may be set to be greater for blocks in a central area of the frame for blocks in the other area. Alternatively, when an image is taken, a user may be allowed to specify particular blocks R[i] [j] to which greater weights are assigned. Alternatively, bocks R[i] [j] to be assigned greater weights may be automatically specified, for example, in accordance with a point at which the focus is aimed.

Now, referring to a flow chart shown in FIG. 14, an example of the process of correcting a solid black area in step S31 shown in FIG. 10 is described in detail below. In step S50, the microcomputer 14 reads, from the memory, the low luminance pixel count information 22 indicating the number, CYL [i] [j], of pixels with luminance equal to or lower than the threshold value in the block R[i] [j] (hereinafter, such a number of pixels will be referred to as a low luminance pixel count CYL[i] [j]>) supplied from the image signal processing unit 12. In the next step S51, based on the read low luminance pixel count information 22, the ratio RYL of the low luminance pixel count is calculated for each block, for example, according to formula (9) described below.

$$R_{YL}[i][j] = \frac{C_{YL}[i][j]}{C_{sum}} \quad (9)$$

where Csum is the sum of the number of pixels of blocks.

In step S52, the microcomputer 14 weights the low luminance pixel count ratio RYL of each block R[i] [j] and calculates the weighed low luminance pixel count ratio RYLW according to formula (10) described below.

$$R_{YLW} = \frac{\sum (R_{YL}[i][j] \times W_3[i][j])}{\sum W_3[i][j]} \quad (10)$$

where W3[i] [j] is a weight assigned to a block R[i] [j].

The weight W3[i] [j] may be set to be greater for blocks in a central area of the frame than for blocks in the other area. Alternatively, when an image is taken, a user may be allowed to specify particular blocks R[i] [j] to which greater weights are assigned. Alternatively, blocks R[i] [j] to which greater weights are assigned may be automatically specified, for example, in accordance with a point at which the image has been brought into focus.

In step S53, the weighted low luminance pixel count ratio RYLW calculated in step S52 is compared with the predetermined threshold value. If it is determined that the weighted low luminance pixel count ratio RYLW is smaller than the threshold value, the process proceeds to step S58. In step S58, the adjustment factor by which to multiple the tone correction adjustment factor gmAmp is calculated using the low luminance pixel count ratio RYLW.

More specifically, in this step S58, the adjustment factor by which to multiply the tone correction adjustment factor gmAmp is calculated using the integral of the low luminance pixel count ratio RYLW of each block R[i] [j]. In the next step S59, the current tone correction adjustment factor gmAmp is multiplied by the determined adjustment factor, and the resultant value is employed as a new value of the tone correction adjustment factor gmAmp.

On the other hand, if the determination in step S53 is that the weighed low luminance pixel count ratio RYLW calculated in step S52 is greater than the threshold value, the process proceeds to step S54. In step S54, the microcomputer 14 determines whether the operation of the imaging apparatus 1 is in the automatic flash mode and the distance to the subject is within the range in which flash light emitted from the flash lamp 17 of the imaging apparatus 1 can reach the subject.

Note that the automatic flash mode is an operation mode in which the flash light emission of the flash lamp 17 is automatically controlled by the microcomputer 14 in accordance with the distance to the subject, the conditions of the optical system such as a shutter speed, and/or external light information.

If the determination in step S54 is that the operation of the imaging apparatus 1 is in the automatic flash mode and the distance to the subject is within the range in which the flash light can reach the subject, then the process proceeds to step S55. In step S55, the microcomputer 14 issues a flash light emission command to the flash lamp 17. Thereafter, in step S56, the tone correction adjustment factor gmAmp is reset.

On the other hand, if the determination in step S54 is that the operation of the imaging apparatus 1 is not in the automatic flash mode or the distance to the subject is not in the range in which the flash light can reach the subject, then the process proceeds to step S57. In step S57, the EV adjustment amount is calculated using the low luminance pixel count ratio RYLW determined in step S51. The microcomputer 14 adjust the shutter speed, the f-stop number, and/or the AGC gain according to the calculated EV adjustment amount. After the EV correction is completed, the process proceeds to step S58.

In the process described above, because the tone correction amount on the image data is determined according to the low luminance pixel count ratio RYLW calculated for each block of the image data in the above-described manner, it is possible to set the tone curve adjustment factor to a large value when the image data includes a large solid black area so that the solid black area is properly corrected to obtain an image with a good tone across the entire area of the image data.

Figure 15:
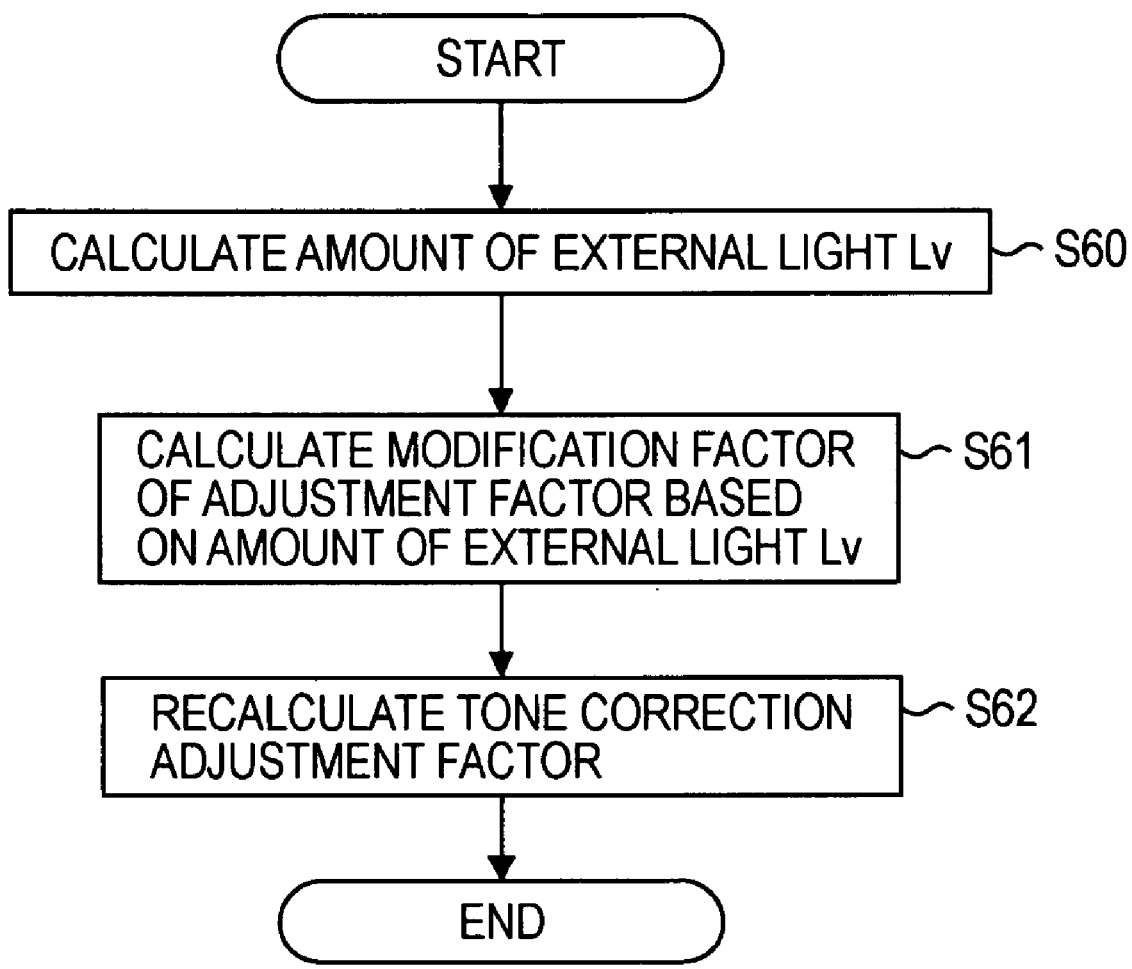
FIG. 15 is a flow chart showing an example of a process of modifying a tone correction adjustment factor according to an amount of external light.

Now, referring to a flow chart shown in FIG. 15, an example of modification of the tone correction adjustment factor based on the external light in step S32 shown in FIG. 10 is described in detail. First, in step S60, the microcomputer 14 calculates the amount of external light Lv, for example, according to the shutter speed T, the f-stop value F, the ISO sensitivity, and the average luminance y of the image data. The amount of external light Lv may be calculated, for example, in accordance with formula (11) described below.

$$L_v = -\text{Log}_2 T + \text{Log}_2 F^2 - \text{Log}_2(iso/100) + \text{Log}_2(y/Y) \quad (11)$$

where Y is a predetermined reference luminance. The shutter speed T takes values 1/30 sec, 1/60 sec, 1/125 sec, and so on, the f-stop value F takes values 1.4, 20.0, 2,8, etc., and so on the ISO sensitivity iso takes values 100, 200, 400, and so on.

In the next step S61, the modification factor Adj2 of the tone correction adjustment factor gmAmp is calculated according to formula (12) using the amount of external light Lv calculated in step S60.

$$Adj_2 = \begin{cases} 0 & \ldots & Lv < LV\_L \\ \frac{Lv + LV\_L}{LV\_H - LV\_L} & \ldots & LV\_L < Lv < LV\_H \\ 1 & \ldots & Lv > LV\_H \end{cases} \quad (12)$$

Figure 16:
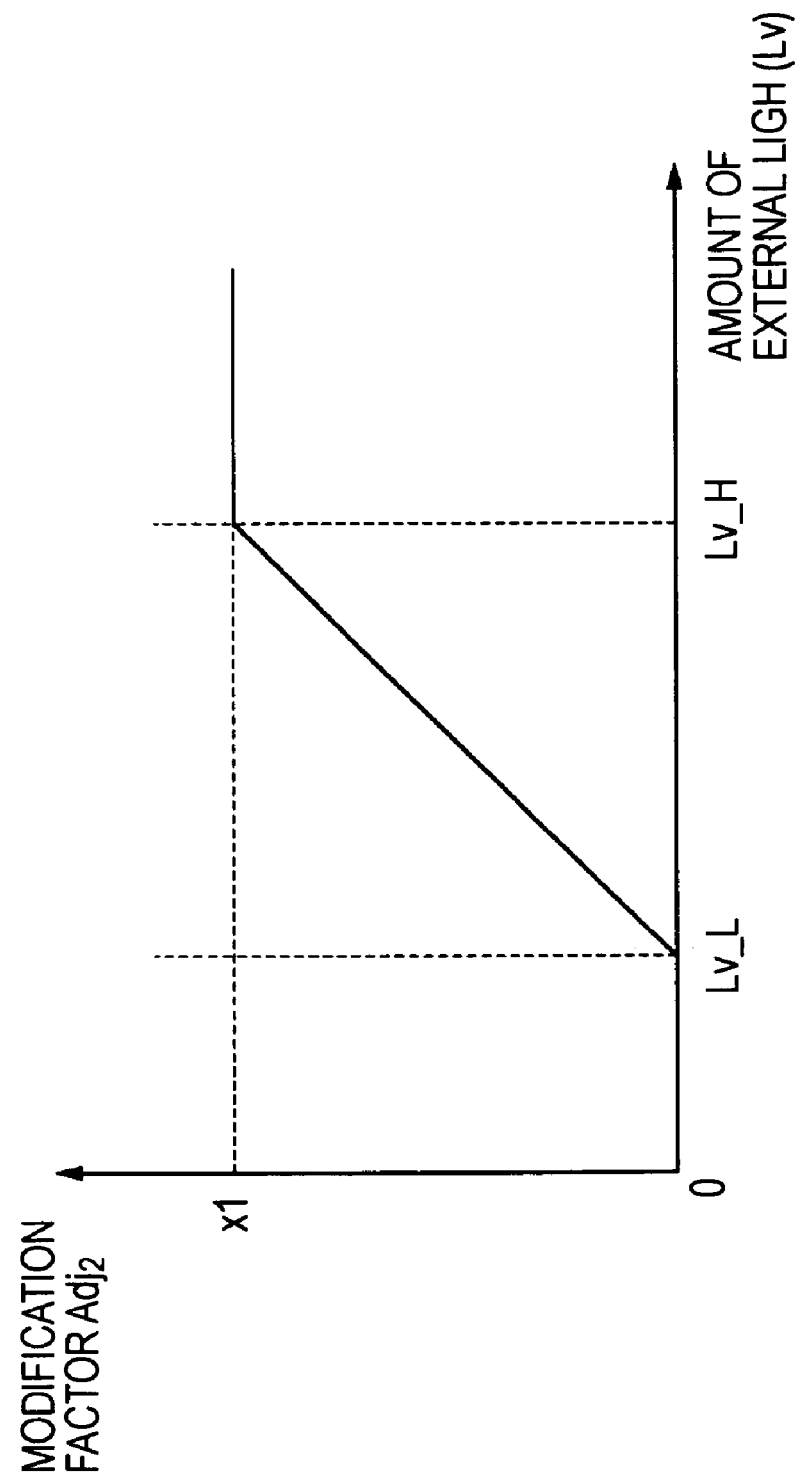
FIG. 16 is a graph showing an example of the relationship between an amount of external light Lv and a modification factor Adj2 of a tone correction adjustment factor.

According to formula (12), as shown in FIG. 16, if the amount of external light Lv is smaller than a predetermined lower threshold value Lv_L, the modification factor Adj2 of the tone correction adjustment factor is set to 0. On the other hand, if the amount of external light Lv is greater than a predetermined higher threshold value Lv_H, the modification factor Adj2 of the tone correction adjustment factor is set to 1. When the amount of external light Lv is within the range from the lower threshold value Lv_L to the higher threshold value Lv_H, the modification factor Adj2 of the tone correction adjustment factor varies in the range from 1 to 0.

If the modification factor Adj2 is calculated, then in the next step S62, the current tone correction adjustment factor gmAmp is multiplied by the modification factor Adj2 and the result is employed as the new value of the tone correction adjustment factor gmAmp, as represented by formula (13).

$$gmAmp \text{ (after adjustment)} = gmAmp \text{ (before adjustment)} \times Adj2 \quad (13)$$

Figure 17:
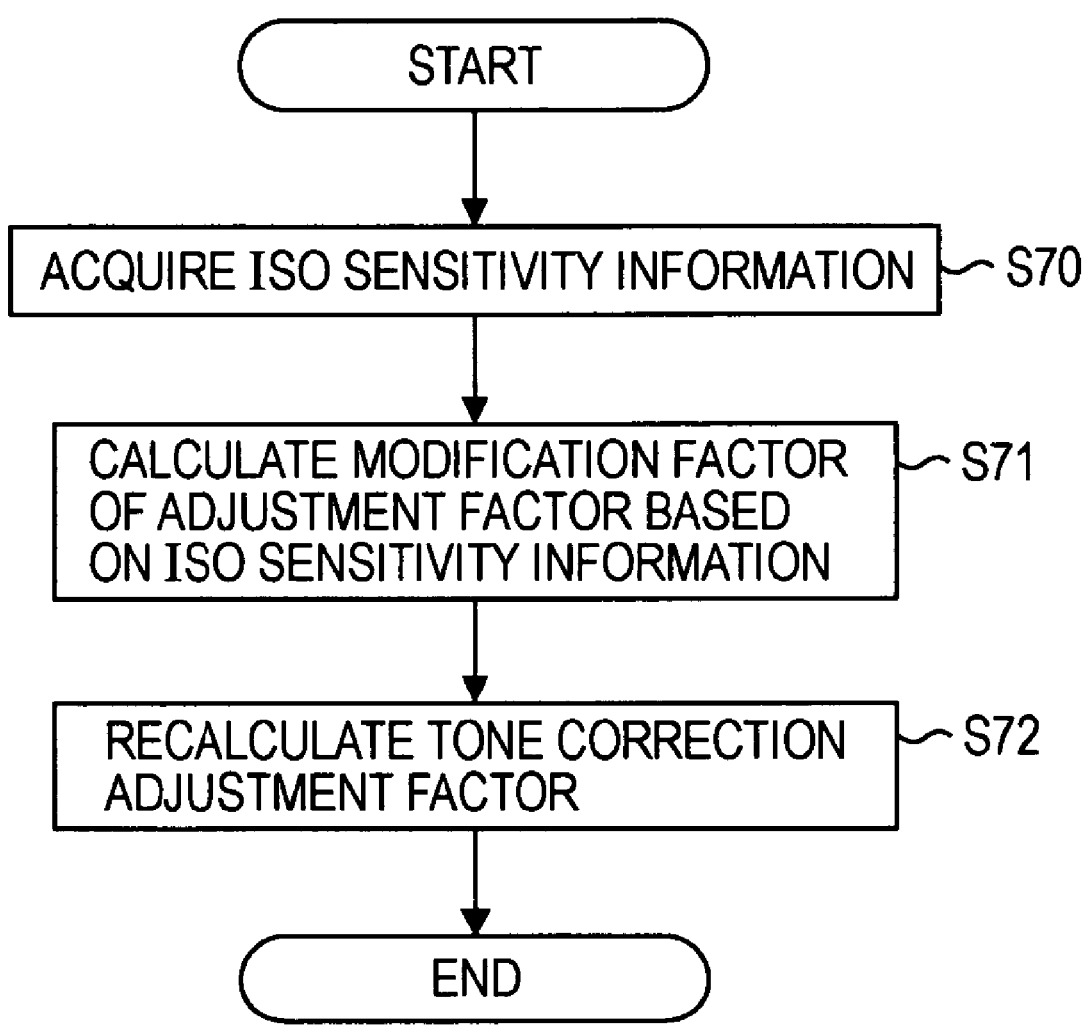
FIG. 17 is a flow chart showing an example of a process of modifying a tone correction adjustment factor according to ISO sensitivity.

Now, referring to a flow chart shown in FIG. 17, an example of modification of the tone correction adjustment factor based on the ISO sensitivity performed in step S33 shown in FIG. 10 is described in detail. The ISO sensitivity may be set in steps of ISO=100, 200, 400, . . . as in the case of the ISO sensitivity of films. The sensitivity of the image sensor increases with the ISO value. However, the noise included in the captured image data also increases with the ISO value. If the ISO sensitivity is specified by a user via an operation unit (not shown) of the imaging apparatus 1, the microcomputer 14 controls the imaging unit 11 in accordance with the specified ISO sensitivity so that the sensitivity of the image sensor is set to the specified value. The ISO sensitivity may be automatically set, for example, in accordance with the amount of external light. In the following discussion, it is assumed that the ISO sensitivity is set to a value specified by a user.

First, in step S70, the microcomputer 14 acquires the ISO sensitivity information iso. In step S71, based on the acquired ISO sensitivity information iso, the modification factor Adj3 of the tone correction adjustment factor gmAmp is calculated according to formula (14) described below.

$$Adj_3 = \begin{cases} 1 & \ldots & iso < \text{ISO\_L} \\ \dfrac{\text{ISO\_H} - iso}{\text{ISO\_H} - \text{ISO\_L}} & \ldots & \text{ISO\_L} < iso < \text{ISO\_H} \\ 0 & \ldots & iso > \text{ISO\_H} \end{cases} \quad (14)$$

Figure 18:
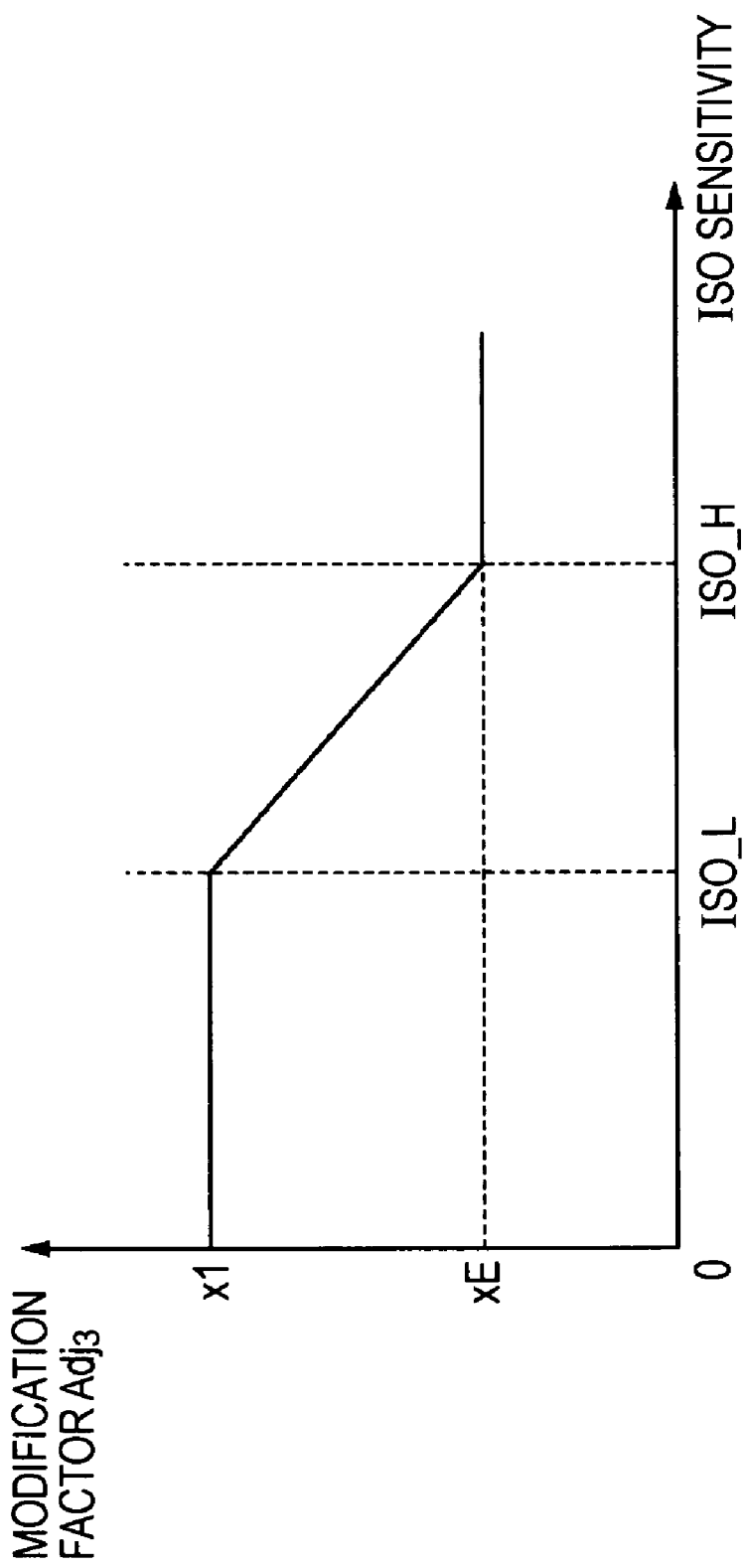
FIG. 18 is a graph showing an example of the relationship between ISO sensitivity and a modification factor Adj3 of a tone correction adjustment factor.
Figure 19A:
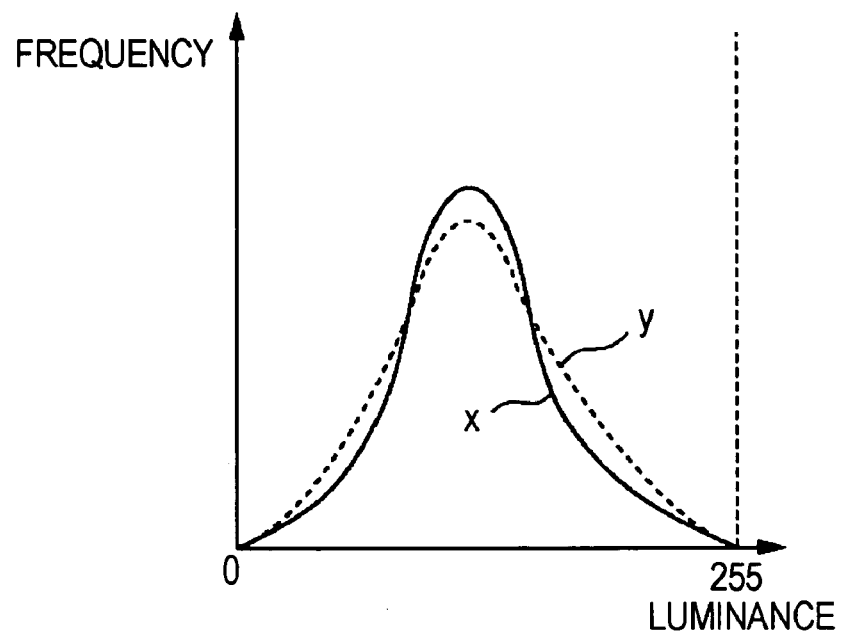
FIGS. 19A and 19B are graphs showing a manner in which a tone correction is made.
Figure 19B:
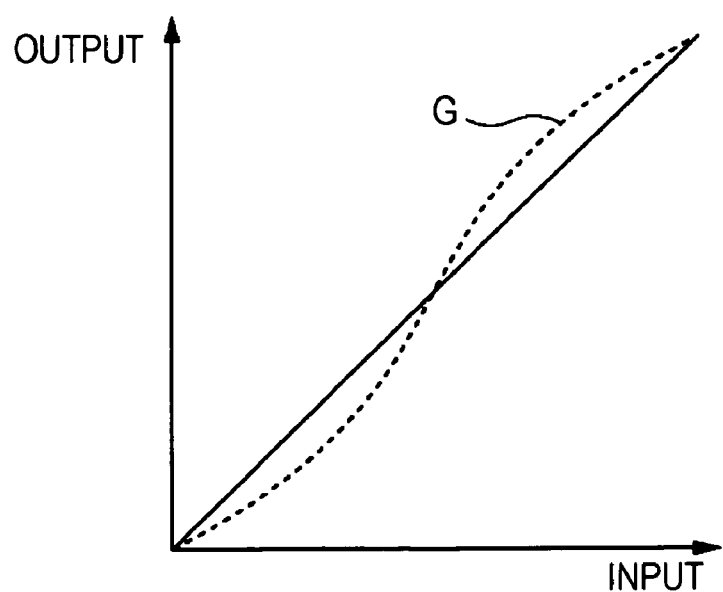
Figure 20A:
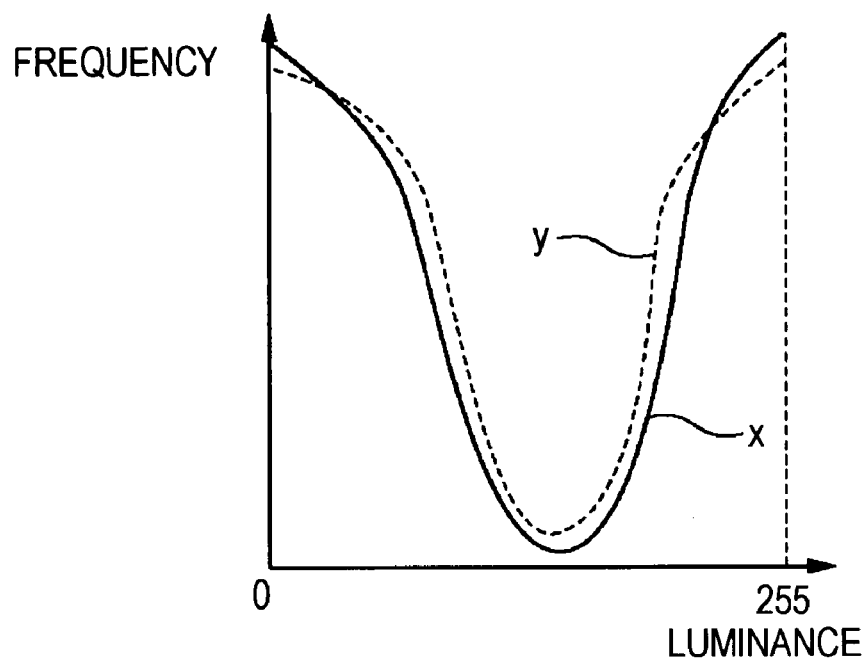
FIGS. 20A and 20B are graphs showing a manner in which a tone correction is made.
Figure 20B:
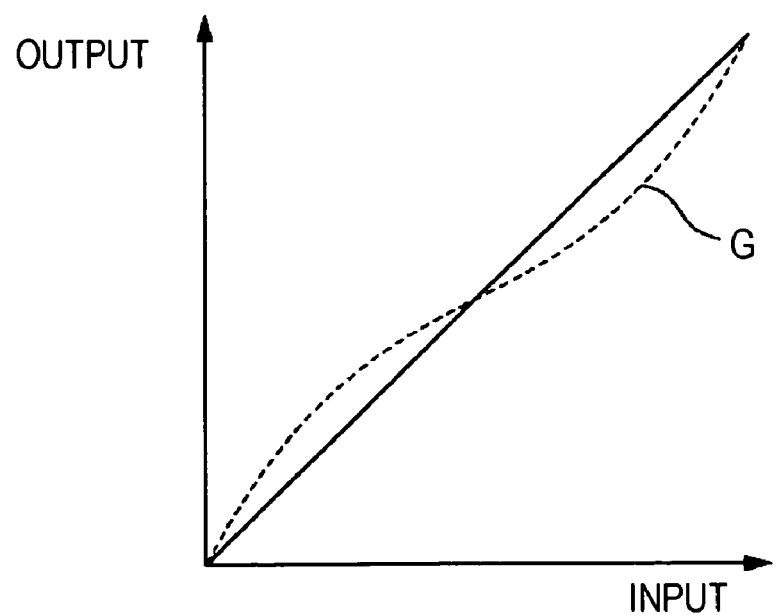

According to formula (14), as shown in FIG. 18, if the ISO sensitivity is lower than a predetermined lower threshold value ISO_L, the modification factor Adj3 of the tone correction adjustment factor gmAmp is set to 1. On the other hand, if the ISO sensitivity is higher than a predetermined higher threshold value ISO_H, the modification factor Adj3 of the tone correction adjustment factor gmAmp is set to a predetermined value E (0<E<1). When the ISO sensitivity is in the range from the lower threshold value ISO_L to the higher threshold value ISO_H, the modification factor Adj3 of the tone correction adjustment factor gmAmp varies in the range from 1 to E. Because noise in the image tends to increase with the ISO sensitivity as described above, the image quality adjustment by the tone correction is decreased with the ISO sensitivity.

If the modification factor Adj3 has been calculated, then in the next step S72, the current tone correction adjustment factor gmAmp is multiplied by the modification factor Adj3 and the result is employed as the new value of the tone correction adjustment factor gmAmp, as represented by formula (15).

$$gmAmp \text{ (after adjustment)} = gmAmp \text{ (before adjustment)} \times Adj3 \quad (15)$$

The imaging apparatus 1 may have scene modes as image taking modes that allow it to take an image under conditions predetermined for respective typical image taking environments. For example, the scene modes may include a portrait mode for taking a portrait image, a landscape mode for taking a landscape image, a night mode for taking an image in the nighttime, and a backlight mode for taking an image against light, in which operating conditions for taking an image are predetermined depending on the mode. For example, the shutter speed T, the f-stop value F, the ISO sensitivity, and the light emission conditions of the flash lamp 17 are preset in the respective scene modes. When an image is taken, a user may select a proper scene mode depending on the purpose of taking the image and/or the image taking environment. This allows it to easily obtain an image with a proper tone.

The tone correction adjustment method according to one of embodiments of the present invention may be applied to the scene modes. That is, a tone correction adjustment factor is properly determined in advance for each scene mode. For example, the tone correction adjustment factor is set to be small for the night mode, while the tone correction adjustment factor is set to be large for the portrait mode. By properly setting the tone correction adjustment factor for each scene mode in the above-described manner and making the tone correction on the image data taken in a scene mode according to the tone correction adjustment factor set for the scene mode, it is possible to easily obtain a beautiful image.

Although in the examples described above, the present invention is applied to an imaging apparatus adapted to take a still image, the present invention is not limited to such an imaging apparatus. For example, the present invention may also be applied to an imaging apparatus adapted to take a moving image. The image signal processing unit 12 and the tone correction unit 13 shown in FIG. 1 may be implemented by software which is executed on a personal computer or the like, and image data may be corrected by the image signal processing unit 12 and the tone correction unit 13 implemented by the software in accordance with the prepared feature histogram table and the tone curve table.

It should be understood by those skilled in the art that various modifications, combinations, sub-combinations and alterations may occur depending on design requirements and other factors insofar as they are within the scope of the appended claims or the equivalents thereof.

The invention claimed is:

1. An imaging apparatus, comprising:
   an imaging unit configured to take an image of a subject and output image data of the image of the subject;
   a histogram producing unit configured to produce a histogram of the image data output from the imaging unit;
   a tone correction unit configured to make a tone correction on the image data output from the imaging unit;
   a feature histogram table in which a plurality of feature histograms respectively corresponding to a plurality of reference image patterns are stored;
   an input-output characteristic table in which a plurality of input-output characteristics respectively corresponding to the plurality of feature histograms are stored;
   an input-output characteristic adjustment unit configured to calculate a degree of approximation of the histogram produced by the histogram producing unit with respect to each of the plurality of feature histograms stored in the feature histogram table, to select an input-output characteristic from the input-output characteristic table in accordance with the calculated degree of approximation, and to adjust the selected input-output characteristic in accordance with the degree of approximation,
   the tone correction unit being configured to make the tone correction using the input-output characteristic adjusted by the input-output characteristic adjustment unit, and
   the imaging apparatus further comprising means for determining whether to modify or adjust the tone correction by considering a number of predetermined factors and for causing the tone correction to be modified or adjusted in accordance with a predetermined procedure from among a plurality of predetermined procedures.

2. The imaging apparatus according to claim 1, wherein the tone correction unit is further configured to adjust the tone correction in accordance with the average luminance over an entire one frame of image data and the average luminance of each one of areas into which the one frame of image data is divided.

3. The imaging apparatus according to claim 1, wherein the tone correction unit is further configured to adjust the tone correction in accordance with the number of pixels of the image data with a luminance equal to or lower than a threshold value.

4. The imaging apparatus according to claim 3, further comprising a flash light emission unit configured to emit flash light,
wherein the emission of flash light by the flash light emission unit is controlled in accordance with the numbers of pixels with a luminance equal to or lower than the threshold value in the respective areas of the image data.

5. The imaging apparatus according to claim 3, further comprising an exposure adjustment unit configured to adjust exposure,
wherein the adjustment of exposure by the exposure adjustment unit is controlled in accordance with the numbers of pixels with a luminance equal to or lower than the threshold value in the respective areas of the image data.

6. The imaging apparatus according to claim 1, wherein the tone correction unit is further configured to adjust the tone correction in accordance with external light information.

7. The imaging apparatus according to claim 1, wherein the tone correction unit is further configured to adjust the tone correction in accordance with ISO information.

8. The imaging apparatus according to claim 1, wherein, of the input-output characteristics stored in the input-output characteristic table, input-output characteristics corresponding to feature histograms having a large frequency in a low luminance range and a small frequency in a high luminance range are set such that the output relative to the input is not compressed in the high luminance range.

9. The imaging apparatus according to claim 1, wherein
the imaging apparatus has a plurality of image taking operation modes respectively corresponding to a plurality of types of environments in which an image is taken, and
the tone correction unit is configured to make the tone correction adaptively depending on the image taking operation mode in which an image is taken.

10. The imaging apparatus according to claim 1, in which one of said factors is a scene mode.

11. The imaging apparatus according to claim 10, in which another one of said factors is a specification of the imaging apparatus.

12. An imaging apparatus, comprising:
an imaging unit configured to take an image of a subject and output image data of the image of the subject;
a histogram producing unit configured to produce a histogram of the image data output from the imaging unit;
a tone correction unit configured to make a tone correction on the image data output from the imaging unit;
a feature histogram table in which a plurality of feature histograms respectively corresponding to a plurality of reference image patterns are stored;
an input-output characteristic table in which a plurality of input-output characteristics respectively corresponding to the plurality of feature histograms are stored;
an input-output characteristic adjustment unit configured to calculate a degree of approximation of the histogram produced by the histogram producing unit with respect to each of the plurality of feature histograms stored in the feature histogram table, to select an input-output characteristic from the input-output characteristic table in accordance with the calculated degree of approximation, and to adjust the selected input-output characteristic in accordance with the degree of approximation,
the tone correction unit being configured to make the tone correction using the input-output characteristic adjusted by the input-output characteristic adjustment unit,
wherein the tone correction unit is further configured to adjust the tone correction in accordance with a number of pixels of the image data with a luminance equal to or lower than a threshold value, and
wherein the tone correction unit is further configured to determine a ratio of the number of pixels of the image data with a luminance equal to or lower than the threshold value to a total number of pixels for each area into which one frame of image data is divided, to weight the ratio of each said area, to calculate a sum of properly weighted ratios of the numbers of pixels of the respective areas over the one frame, and to adjust the tone correction in accordance with the calculated sum.

13. An imaging method, comprising:
taking an image of a subject and outputting image data of the image of the subject;
producing a histogram of the output image data by use of a histogram producing unit;
making a tone correction on the output image data by use of a tone correction unit; and
adjusting an input-output characteristic by calculating a degree of approximation of the produced histogram with respect to each of a plurality of feature histograms stored in a feature histogram table and respectively corresponding to a plurality of reference image patterns, selecting, in accordance with the calculated degree of approximation, one of input-output characteristics stored in an input-output characteristic table and respectively corresponding to the plurality of feature histograms, and adjusting the selected input-output characteristic in accordance with the degree of approximation by use of an input-output characteristic adjustment unit,
the tone correction step including making the tone correction using the adjusted input-output characteristic, and
the imaging method further comprising determining whether to modify or adjust the tone correction by considering a number of predetermined factors and modifying or adjusting the tone correction in accordance with a predetermined procedure from among a plurality of predetermined procedures.

14. A computer-readable medium having stored thereon an imaging program configured to be executed by a computer to implement an imaging method, the method comprising:
taking an image of a subject and outputting image data of the image of the subject;
producing a histogram of the output image data;
making a tone correction on the output image data; and
adjusting an input-output characteristic by calculating a degree of approximation of the produced histogram with respect to each of a plurality of feature histograms stored in a feature histogram table and respectively corresponding to a plurality of reference image patterns, selecting, in accordance with the calculated degree of approximation, one of input-output characteristics stored in an input-output characteristic table and respectively corresponding to the plurality of feature histograms, and adjusting the selected input-output characteristic in accordance with the degree of approximation,
the tone correction step including making the tone correction using the adjusted input-output characteristic, and
the imaging method further comprising determining whether to modify or adjust the tone correction by considering a number of predetermined factors and modifying or adjusting the tone correction in accordance with a predetermined procedure from among a plurality of predetermined procedures.

15. An image processing apparatus, comprising:
a histogram producing unit configured to produce a histogram of image data;

a tone correction unit configured to make a tone correction on the image data;

a feature histogram table in which a plurality of feature histograms respectively corresponding to a plurality of reference image patterns are stored;

an input-output characteristic table in which a plurality of input-output characteristics respectively corresponding to the plurality of feature histograms are stored; and an input-output characteristic adjustment unit configured to calculate a degree of approximation of the histogram produced by the histogram producing unit with respect to each of the plurality of feature histograms stored in the feature histogram table, to select an input-output characteristic from the input-output characteristic table in accordance with the calculated degree of approximation, and to adjust the selected input-output characteristic in accordance with the degree of approximation, the tone correction unit being configured to make the tone correction using the input-output characteristic adjusted by the input-output characteristic adjustment unit, and the image processing apparatus further comprising means for determining whether to modify or adjust the tone correction by considering a number of predetermined factors and for causing the tone correction to be modified or adjusted in accordance with a predetermined procedure from among a plurality of predetermined procedures.

16. The image processing apparatus according to claim 15, wherein the tone correction unit is further configured to adjust the tone correction in accordance with the average luminance over an entire one frame of image data and the average luminance of each one of areas into which the one frame of image data is divided.

17. The image processing apparatus according to claim 15, wherein the tone correction unit is further configured to adjust the tone correction in accordance with the number of pixels of the image data with a luminance equal to or lower than a threshold value.

18. The image processing apparatus according to claim 15, wherein, of the input-output characteristics stored in the input-output characteristic table, input-output characteristics corresponding to feature histograms having a large frequency in a low luminance range and a small frequency in a high luminance range are set such that the output relative to the input is not amplified in the high luminance range.

19. An image processing apparatus, comprising:

a histogram producing unit configured to produce a histogram of image data;

a tone correction unit configured to make a tone correction on the image data;

a feature histogram table in which a plurality of feature histograms respectively corresponding to a plurality of reference image patterns are stored;

an input-output characteristic table in which a plurality of input-output characteristics respectively corresponding to the plurality of feature histograms are stored; and an input-output characteristic adjustment unit configured to calculate a degree of approximation of the histogram produced by the histogram producing unit with respect to each of the plurality of feature histograms stored in the feature histogram table, to select an input-output characteristic from the input-output characteristic table in accordance with the calculated degree of approximation, and to adjust the selected input-output characteristic in accordance with the degree of approximation, the tone correction unit being configured to make the tone correction using the input-output characteristic adjusted by the input-output characteristic adjustment unit, wherein the tone correction unit is further configured to adjust the tone correction in accordance with a number of pixels of the image data with a luminance equal to or lower than a threshold value, and wherein the tone correction unit is further configured to determine a ratio of the number of pixels of the image data with a luminance equal to or lower than the threshold value to a total number of pixels for each area into which one frame of image data is divided, to weight the ratio of each said area, to calculate a sum of properly weighted ratios of the numbers of pixels of the respective areas over the one frame, and to adjust the tone correction in accordance with the calculated sum.

20. An image processing method, comprising:

producing a histogram of image data by use of a histogram producing unit;

making a tone correction on the image data by use of a tone correction unit; and adjusting an input-output characteristic by calculating a degree of approximation of the produced histogram with respect to each of a plurality of feature histograms stored in a feature histogram table and respectively corresponding to a plurality of reference image patterns, selecting, in accordance with the calculated degree of approximation, one of input-output characteristics stored in an input-output characteristic table and respectively corresponding to the plurality of feature histograms, and adjusting the selected input-output characteristic in accordance with the degree of approximation by use of an input-output characteristic adjustment unit, the tone correction step including making the tone correction using the adjusted input-output characteristic, and the image processing method further comprising determining whether to modify or adjust the tone correction by considering a number of predetermined factors and modifying or adjusting the tone correction in accordance with a predetermined procedure from among a plurality of predetermined procedures.

21. A computer-readable medium having stored thereon an image processing program configured to be executed by a computer to implement an image processing method, the method comprising:

producing a histogram of image data;

making a tone correction on the image data; and adjusting an input-output characteristic by calculating a degree of approximation of the produced histogram with respect to each of a plurality of feature histograms stored in a feature histogram table and respectively corresponding to a plurality of reference image patterns, selecting, in accordance with the calculated degree of approximation, one of input-output characteristics stored in an input-output characteristic table and respectively corresponding to the plurality of feature histograms, and adjusting the selected input-output characteristic in accordance with the degree of approximation, the tone correction step including making the tone correction using the adjusted input-output characteristic, and the image processing method further comprising determining whether to modify or adjust the tone correction by considering a number of predetermined factors and modifying or adjusting the tone correction in accordance with a predetermined procedure from among a plurality of predetermined procedures.

* * * * *